United States Patent
Tanaka et al.

(10) Patent No.: US 10,066,049 B2
(45) Date of Patent: Sep. 4, 2018

(54) CURABLE COMPOSITION

(71) Applicant: DAIKIN INDUSTRIES, LTD., Osaka-shi, Osaka (JP)

(72) Inventors: Yoshito Tanaka, Osaka (JP); Tadashi Kanbara, Osaka (JP); Kouji Kubota, Osaka (JP); Jun Miki, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/112,568

(22) PCT Filed: Jan. 16, 2015

(86) PCT No.: PCT/JP2015/051053
§ 371 (c)(1),
(2) Date: Jul. 19, 2016

(87) PCT Pub. No.: WO2015/111513
PCT Pub. Date: Jul. 30, 2015

(65) Prior Publication Data
US 2016/0333135 A1    Nov. 17, 2016

(30) Foreign Application Priority Data
Jan. 22, 2014   (JP) .................................. 2014-009760

(51) Int. Cl.
*C08G 59/22*   (2006.01)
*C08G 59/24*   (2006.01)
(Continued)

(52) U.S. Cl.
CPC ........... *C08G 59/22* (2013.01); *C08G 59/226* (2013.01); *C08G 59/24* (2013.01); *C08K 5/1515* (2013.01); *C08L 63/00* (2013.01)

(58) Field of Classification Search
None
See application file for complete search history.

(56) References Cited

U.S. PATENT DOCUMENTS 5,387,646 A * 2/1995 Nakahata ............. C08G 59/306
                                                      525/103
5,712,355 A * 1/1998 Jones .................. C08F 214/186
                                                      526/254

(Continued)

FOREIGN PATENT DOCUMENTS

JP    59-174657 A    10/1984
JP    62-199612 A    9/1987
(Continued)

OTHER PUBLICATIONS

International Preliminary Report on Patentability issued from the International Bureau in counterpart International Application No. PCT/JP2015/051053, dated Jul. 26, 2016.

(Continued)

*Primary Examiner* — Randy P Gulakowski
*Assistant Examiner* — Ha S Nguyen
(74) *Attorney, Agent, or Firm* — Sughrue Mion, PLLC

(57) ABSTRACT

The present invention aims to provide a heat-curable composition that is capable of providing a cured product having low vapor permeability, a low linear expansion coefficient, and a low refractive index. The present invention relates to a curable composition including a fluorine-containing polymer having a hydroxyl value of 100 mgKOH/g or higher and a refractive index of 1.42 or lower and an epoxy compound.

8 Claims, 1 Drawing Sheet

(51) Int. Cl.
C08K 5/1515 (2006.01)
C08L 63/00 (2006.01)
C08L 27/12 (2006.01)

(56) References Cited

U.S. PATENT DOCUMENTS

2004/0002575 A1   1/2004  Araki et al.
2006/0054053 A1*  3/2006  Masutani ............. C08G 65/007
                                                                                 106/2

FOREIGN PATENT DOCUMENTS

| JP | 9-504994 A | 5/1997 |
| JP | 2008-208384 A | 9/2008 |
| WO | 1995/013858 A1 | 5/1995 |

OTHER PUBLICATIONS

International Search Report for PCT/JP2015/051053 dated Feb. 17, 2015.

* cited by examiner

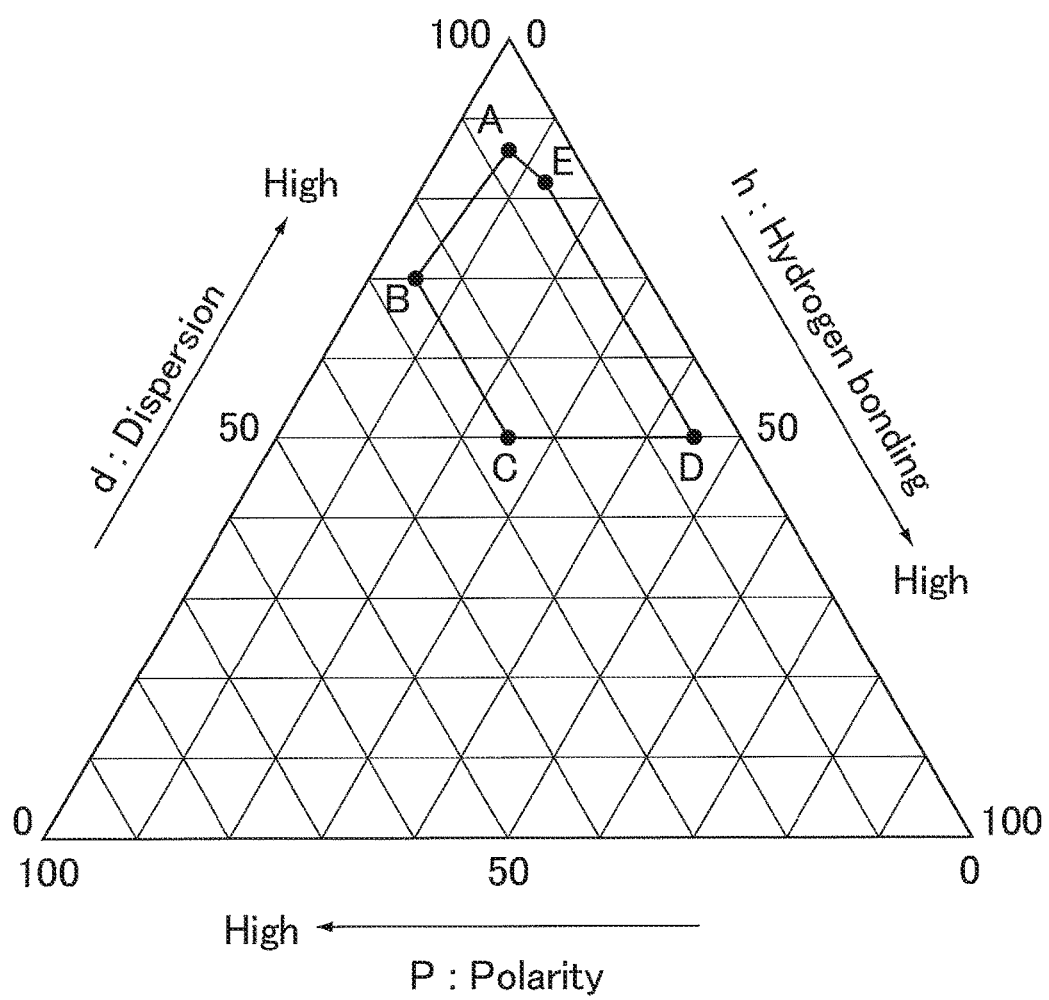

CURABLE COMPOSITION

CROSS REFERENCE TO RELATED APPLICATIONS

This application is a National Stage of International Application No. PCT/JP2015/051053 filed Jan. 16, 2015, claiming priority based on Japanese Patent Application No. 2014-009760 filed Jan. 22, 2014, the contents of all of which are incorporated herein by reference in their entirety.

TECHNICAL FIELD

The present invention relates to curable compositions.

BACKGROUND ART

Compositions containing a hydroxy- and fluorine-containing polymer and a multifunctional curing agent reactive with the hydroxy group are well known to be curable by heat.

For example, Patent Literature 1 discloses that a composition for coating obtained by dissolving a specific fluorine-containing polymer and a curing agent in an organic solvent is excellent in workability, and provides a coating film excellent in oil resistance and water resistance.

Patent Literature 2 discloses a substrate which has a continuous through hole and the inside of which is at least partially coated with a copolymer of a fluorinated unsaturated ethylenic monomer and a vinyl alcohol, wherein the —OH components are crosslinked by a multifunctional epoxide so as to prevent the copolymer from being solubilized by any solvent.

CITATION LIST

Patent Literature

Patent Literature 1: JP S59-174657 A
Patent Literature 2: JP H09-504994 T

SUMMARY OF INVENTION

Technical Problem

The present invention aims to provide a heat-curable composition capable of providing a cured product having low vapor permeability, a low linear expansion coefficient, and a low refractive index.

Solution to Problem

The inventors found that use of an epoxy compound as a crosslinker for crosslinking a fluorine-containing polymer having a hydroxyl value of 100 mgKOH/g or higher and a refractive index of 1.42 or lower leads to a cured product having low vapor permeability, a low linear expansion coefficient, and a low refractive index. Thereby, the inventors completed the present invention.

In other words, the present invention relates to a curable composition containing a fluorine-containing polymer having a hydroxyl value of 100 mgKOH/g or higher and a refractive index of 1.42 or lower, and an epoxy compound.

The curable composition preferably further contains an acid anhydride.

The fluorine-containing polymer preferably includes a fluoroolefin unit and a vinyl alcohol unit.

The fluorine-containing polymer preferably has a fluoroolefin unit content of 30 mol % or more.

The fluorine-containing polymer preferably further includes a unit based on a monomer represented by the following formula (1):

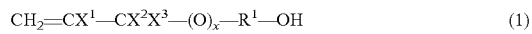

wherein $X^1$, $X^2$, and $X^3$ may be the same as or different from each other, and are each H, F, or a fluoroalkyl group; $R^1$ is a divalent organic group which may optionally have an ether bond; and x is 0 or 1.

The curable composition preferably further contains a curing accelerator.

Preferably, the epoxy compound is in a liquid state at 25° C., and has a ratio of a dispersion component, a polarity component, and a hydrogen bonding component of a solubility parameter within the range defined by the point A (86, 7, 7), the point B (70, 25, 5), the point C (50, 25, 25), the point D (50, 5, 45), and the point E (82, 5, 13) illustrated in FIG. 1.

The epoxy compound is preferably at least one compound selected from the following compounds.

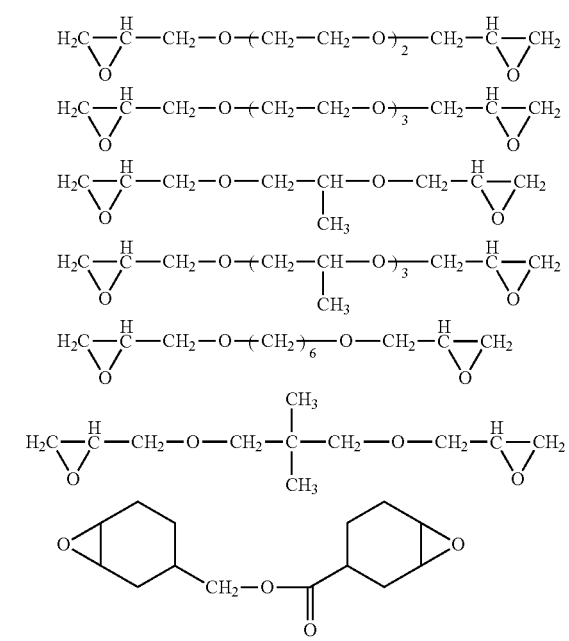

The curable composition is preferably free from an organic solvent that has no radical reactive group.

Advantageous Effects of Invention

Since having the aforementioned configuration, the curable composition of the present invention is a heat-curable composition and is capable of providing a cured product having low vapor permeability, a low linear expansion coefficient, and a low refractive index.

BRIEF DESCRIPTION OF THE DRAWINGS

FIG. 1 is a ternary diagram indicating the ratio of the dispersion component, the polarity component, and the hydrogen bonding component of the solubility parameter of the epoxy compound.

DESCRIPTION OF EMBODIMENTS

The present invention will be specifically described hereinbelow.

The curable composition of the present invention contains a fluorine-containing polymer having a hydroxyl value of 100 mgKOH/g or higher and a refractive index of 1.42 or lower. Thus, the curable composition is capable of providing a cured product having low vapor permeability, a high elastic modulus, a low linear expansion coefficient, and a low refractive index.

The phrase "a cured product has a low refractive index" and the like phrases herein mean that the cured product has a refractive index of 1.55 or lower.

The fluorine-containing polymer having too low a hydroxyl value may have poor solubility in an epoxy compound. The hydroxyl value is 100 mgKOH/g or higher, preferably 110 mgKOH/g or higher, more preferably 120 mgKOH/g or higher. The hydroxyl value is also preferably 700 mgKOH/g or lower, more preferably 650 mgKOH/g or lower, still more preferably 600 mgKOH/g or lower, much more preferably 550 mgKOH/g or lower, particularly preferably 500 mgKOH/g or lower.

The hydroxyl value is a value determined in conformity with JIS K0070-1992.

The fluorine-containing polymer having too high a refractive index may fail to give a cured product having a sufficiently low refractive index. The refractive index is 1.42 or lower, preferably 1.41 or lower, more preferably 1.40 or lower. The refractive index is also preferably 1.34 or higher, more preferably 1.35 or higher, still more preferably 1.36 or higher.

The refractive index is a value determined at 25° C. using an Abbe refractometer (Atago Co., Ltd.) with sodium D lines as a light source.

The fluorine-containing polymer may be any polymer including a fluorine atom and having a hydroxyl value and a refractive index within the above respective ranges, and may be preferably a fluorine-containing polymer (hereinafter, also referred to as a fluorine-containing polymer (I)) including a fluoroolefin unit and a vinyl alcohol unit ($-CH_2-CH(OH)-$). The fluorine-containing polymer (I) is a fluorine-containing polymer that can relatively inexpensively increase the fluorine content and the glass transition temperature without any expensive functional group-containing monomers. Thus, the curable composition of the present invention is capable of inexpensively providing a cured product having low vapor permeability, a high elastic modulus, a low linear expansion coefficient, and a low refractive index.

The fluoroolefin unit means a polymerized unit based on a fluoroolefin. The fluoroolefin is a monomer having a fluorine atom.

The fluoroolefin is preferably at least one fluoroolefin selected from the group consisting of tetrafluoroethylene (TFE), vinylidene fluoride (VdF), chlorotrifluoroethylene (CTFE), vinyl fluoride, hexafluoropropylene (HFP), hexafluoroisobutene, a monomer represented by $CH_2=CZ^1(CF_2)_{n1}Z^2$ (wherein $Z^1$ is H, F, or Cl; $Z^2$ is H, F, or Cl; n1 is an integer of 1 to 10), a perfluoro(alkyl vinyl ether) (PAVE) represented by $CF_2=CF-OR_F^1$ (wherein $R_F^1$ is a C1-C8 perfluoroalkyl group), and an alkyl perfluorovinyl ether derivative represented by $CF_2=CF-OCH_2-R_F^2$ (wherein $R_F^2$ is a C1-C5 perfluoroalkyl group).

Examples of the monomer represented by $CH_2=CZ^1(CF_2)_{n1}Z^2$ include $CH_2=CFCF_3$, $CH_2=CHCF_3$, $CH_2=CFCHF_2$, and $CH_2=CCCF_3$.

Examples of the PAVE include perfluoro(methyl vinyl ether) (PMVE), perfluoro(ethyl vinyl ether) (PEVE), perfluoro(propyl vinyl ether) (PPVE), and perfluoro(butyl vinyl ether). PMVE, PEVE, or PPVE is more preferred.

The alkyl perfluorovinyl ether derivative is preferably one in which $R_F^2$ is a C1-C3 perfluoroalkyl group, more preferably $CF_2=CF-OCH_2-CF_2CF_3$.

The fluoroolefin is more preferably at least one selected from the group consisting of TFE, CTFE, and HFP, still more preferably TFE.

The fluorine-containing polymer (I) preferably has a fluoroolefin unit content of 30 mol % or more in the fluorine-containing polymer (I). More preferably, the fluoroolefin unit content is 30 mol % or more and 80 mol % or less and the vinyl alcohol unit content is 20 mol % or more and 70 mol % or less. The fluorine-containing polymer (I) having the monomer unit contents within the above respective ranges is capable of providing a cured product having lower vapor permeability, a higher elastic modulus, a lower linear expansion coefficient, and a lower refractive index. With respect to the respective monomer unit contents, still more preferably, the fluoroolefin unit content is 40 mol % or more and 80 mol % or less while the vinyl alcohol unit content is 20 mol % or more and 60 mol % or less; much more preferably, the fluoroolefin unit content is 40 mol % or more and 75 mol % or less, while the vinyl alcohol unit content is 25 mol % or more and 60 mol % or less; particularly preferably, the fluoroolefin unit content is 45 mol % or more and 70 mol % or less, while the vinyl alcohol unit content is 30 mol % or more and 55 mol % or less.

The fluorine-containing polymer (I) preferably has an alternation rate between the fluoroolefin unit and the vinyl alcohol unit of lower than 95%. The polymer (I) having an alternation rate within this range may have improved solubility in an epoxy compound. The alternation rate is more preferably 90% or lower, particularly preferably 80% or lower. The alternation rate is also preferably 30% or higher, more preferably 35% or higher, still more preferably 40% or higher. Too low an alternation rate is not preferred because it may cause poor heat resistance.

The alternation rate between the fluoroolefin unit and the vinyl alcohol unit can be calculated as an alternation rate of three units by the following formula using a solvent such as hexadeuteroacetone capable of dissolving the fluorine-containing polymer (I) by $^1$H-NMR measurement on the fluorine-containing polymer (I).

$$\text{Alternation rate (\%)}=C/(A+B+C)\times100$$

wherein

A: number of V units bonded to two V units, for example, in the form of -V-V-V-, B: number of V units bonded to one V unit and one T unit, for example, in the form of -V-V-T-, C: number of V units bonded to two T units, for example, in the form of -T-V-T-, (T: fluoroolefin unit, V: vinyl alcohol unit).

The number of V units in each of A, B, and C is calculated from the intensity ratio of H in the main chain bonded to a tertiary carbon atom in the vinyl alcohol unit ($-CH_2-CH(OH)-$) in the $^1$H-NMR measurement. The intensity ratio of H in the main chain was estimated by $^1$H-NMR measurement with a fluorine-containing polymer before hydroxylation.

The fluorine-containing polymer (I) may further include a vinyl ester monomer unit represented by $-CH_2-CH(O(C=O)R)-$ (wherein R is a hydrogen atom or a C1-C17 hydrocarbon group). As mentioned here, that the fluorine-containing polymer (I) includes a fluoroolefin unit, a vinyl alcohol unit, and a vinyl ester monomer unit is also one preferred embodiment of the present invention. Further, that the fluorine-containing polymer (I) is a fluoroolefin/vinyl alcohol/vinyl ester monomer copolymer consisting essentially of a fluoroolefin unit, a vinyl alcohol unit, and a vinyl ester monomer unit is also one preferred embodiment of the present invention.

The vinyl ester monomer unit is a monomer unit represented by —$CH_2$—CH(O(C=O)R)— (wherein R is a hydrogen atom or a C1-C17 hydrocarbon group). R in the formula is preferably a C1-C11 alkyl group, more preferably a C1-C5 alkyl group. R is particularly preferably a C1-C3 alkyl group.

Examples of the vinyl ester monomer unit include monomer units derived from the following vinyl esters:

vinyl formate, vinyl acetate, vinyl propionate, vinyl butyrate, vinyl isobutyrate, vinyl valerate, vinyl isovalerate, vinyl caproate, vinyl heptanoate, vinyl caprylate, vinyl pivalate, vinyl pelargonate, vinyl caprate, vinyl laurate, vinyl myristate, vinyl pentadecylate, vinyl palmitate, vinyl margarate, vinyl stearate, vinyl octylate, VeoVa-9 (Showa Shell Sekiyu K. K.), VeoVa-10 (Showa Shell Sekiyu K. K.), vinyl benzoate, and vinyl versatate.

Preferred among these are monomer units derived from vinyl acetate, vinyl propionate, vinyl versatate, or vinyl stearate. More preferred are a vinyl acetate monomer unit, a vinyl propionate monomer unit, and a vinyl stearate monomer unit, still more preferred is a vinyl acetate monomer unit.

With respect to the respective monomer unit contents in the fluorine-containing polymer (I) including a fluoroolefin unit, a vinyl alcohol unit, and a vinyl ester monomer unit, preferably, the fluoroolefin unit content is 30 mol % or more and 80 mol % or less, the vinyl alcohol unit content is 17 mol % or more and less than 70 mol %, and the vinyl ester monomer unit content is more than 0 mol % and not more than 53 mol %. The polymer (I) having the monomer unit contents within the above respective ranges is capable of providing a cured product having lower vapor permeability, a higher elastic modulus, a lower linear expansion coefficient, and a lower refractive index. With respect to the respective monomer unit contents, more preferably, the fluoroolefin unit content is 35 mol % or more and 80 mol % or less, the vinyl alcohol unit content is 17 mol % or more and less than 65 mol %, and the vinyl ester monomer unit content is more than 0 mol % and 48 mol % or less; still more preferably, the fluoroolefin unit content is 35 mol % or more and 75 mol % or less, the vinyl alcohol unit content is 17 mol % or more and 60 mol % or less, and the vinyl ester monomer unit content is 5 mol % or more and 48 mol % or less; much more preferably, the fluoroolefin unit content is 45 mol % or more and 70 mol % or less, the vinyl alcohol unit content is 17 mol % or more and 50 mol % or less, and the vinyl ester monomer unit content is 5 mol % or more and 38 mol % or less.

The fluorine-containing polymer (I) including a fluoroolefin unit, a vinyl alcohol unit, and a vinyl ester monomer unit preferably has an alternation rate between the fluoroolefin unit and the vinyl alcohol or vinyl ester monomer unit of lower than 95%. The polymer (I) having an alternation rate within this range may have improved solubility in an epoxy compound. The alternation rate is more preferably 90% or lower, particularly preferably 80% or lower. The alternation rate is also preferably 30% or higher, more preferably 35% or higher, still more preferably 40% or higher. Too low an alternation rate is not preferred because it may cause poor heat resistance.

The alternation rate between the fluoroolefin unit and the vinyl alcohol or vinyl ester monomer unit can be calculated as an alternation rate of three units by the following formula using a solvent such as hexadeuteroacetone capable of dissolving the fluorine-containing polymer (I) by $^1$H-NMR measurement on the fluorine-containing polymer (I).

Alternation rate (%)=$C/(A+B+C)\times 100$ wherein

A: number of V units bonded to two V units, for example, in the form of -V-V-V-, B: number of V units bonded to one V unit and one T unit, for example, in the form of -V-V-T-, C: number of V units bonded to two T units, for example, in the form of -T-V-T-, (T: fluoroolefin unit, V: vinyl alcohol or vinyl ester monomer unit).

The number of V units in each of A, B, and C is calculated from the intensity ratio of H in the main chain bonded to a tertiary carbon atom in the vinyl alcohol unit (—$CH_2$—CH (OH)—) and the vinyl ester monomer unit (—$CH_2$—CH(O (C=O)R)—) in the $^1$H-NMR measurement. The intensity ratio of H in the main chain was estimated by $^1$H-NMR measurement with a fluorine-containing polymer before hydroxylation.

The fluorine-containing polymer (I) may include any additional monomer unit other than the fluoroolefin unit, the vinyl alcohol unit, and the vinyl ester monomer unit to the extent that the effects of the present invention are not impaired.

The additional monomer, if it is a monomer free from a fluorine atom (but is not a vinyl alcohol nor a vinyl ester monomer), is preferably at least one fluorine-free ethylenic monomer selected from the group consisting of ethylene, propylene, 1-butene, 2-butene, vinyl chloride, vinylidene chloride, vinyl ether monomers, and unsaturated carboxylic acids.

The total additional monomer unit content is preferably 0 to 50 mol %, more preferably 0 to 40 mol %, still more preferably 0 to 30 mol %, in all the monomer units of the fluorine-containing polymer (I).

The amounts of the respective monomer units constituting the fluorine-containing polymer (I) herein can be calculated by any appropriate combination of NMR, FT-IR, and elemental analysis in accordance with the types of the monomers.

The fluorine-containing polymer (I) may have any weight average molecular weight, and is preferably 9,000 or more, more preferably 10,000 or more. The weight average molecular weight is still more preferably 20,000 to 2,000, 000, particularly preferably 30,000 to 1,000,000.

The weight average molecular weight can be determined by gel permeation chromatography (GPC).

As will be mentioned later, the fluorine-containing polymer (I) can be produced by hydroxylating a copolymer including a fluoroolefin unit and a vinyl ester monomer unit. In other words, that the fluorine-containing polymer (I) is a copolymer obtained by hydroxylating a copolymer including a fluoroolefin unit and a vinyl ester monomer unit is also one preferred embodiment of the present invention.

The following will describe a method of producing the fluorine-containing polymer (I).

The fluorine-containing polymer (I) is usually produced by copolymerizing a fluoroolefin such as tetrafluoroethylene and a vinyl ester monomer such as vinyl acetate, and then hydroxylating the resulting copolymer. In order to achieve an alternation rate of lower than 95% in the fluorine-containing polymer (I), the polymerization is preferably performed under conditions that make it possible to keep substantially constant the compositional ratio between the fluoroolefin and the vinyl ester monomer. In other words, the fluorine-containing polymer (I) is preferably produced by a method including the steps of: polymerizing a fluoroolefin and a vinyl ester monomer under conditions that make it possible to keep substantially constant the compositional ratio therebetween to provide a copolymer including a fluoroolefin unit and a vinyl ester monomer unit; and hydroxylating the resulting copolymer to provide a copolymer including a fluoroolefin unit and a vinyl alcohol unit.

Examples of the vinyl ester monomer include vinyl formate, vinyl acetate, vinyl propionate, vinyl butyrate, vinyl isobutyrate, vinyl valerate, vinyl isovalerate, vinyl caproate, vinyl heptanoate, vinyl caprylate, vinyl pivalate, vinyl pelargonate, vinyl caprate, vinyl laurate, vinyl myristate, vinyl pentadecylate, vinyl palmitate, vinyl margarate, vinyl stearate, vinyl octylate, VeoVa-9 (Showa Shell Sekiyu K. K.), VeoVa-10 (Showa Shell Sekiyu K. K.), vinyl benzoate, and vinyl versatate. Preferably used among these is vinyl acetate, vinyl propionate, or vinyl versatate because they are easily available and inexpensive.

These vinyl ester monomers may be used alone, or may be used in admixture of two or more.

The fluoroolefin and the vinyl ester monomer may be copolymerized by solution polymerization, bulk polymerization, emulsion polymerization, suspension polymerization, or the like. Preferred is emulsion polymerization, solution polymerization, or suspension polymerization because these methods are industrially easy to perform, but the method is not limited thereto.

In emulsion polymerization, solution polymerization, or suspension polymerization, additives such as a polymerization initiator, a solvent, a chain-transfer agent, a surfactant, and a dispersant may be used, and they may be ones usually used.

The solvent to be used in solution polymerization is preferably one capable of dissolving the fluoroolefin and the vinyl ester monomer, as well as the fluorine-containing polymer (I) to be synthesized. Examples thereof include esters such as n-butyl acetate, t-butyl acetate, ethyl acetate, methyl acetate, and propyl acetate; ketones such as acetone, methyl ethyl ketone, and cyclohexanone; aliphatic hydrocarbons such as hexane, cyclohexane, and octane; aromatic hydrocarbons such as benzene, toluene, and xylene; alcohols such as methanol, ethanol, t-butanol, and isopropanol; cyclic ethers such as tetrahydrofuran and dioxane; fluorosolvents such as HCFC-225; and dimethyl sulfoxide, dimethyl formamide, and any mixtures thereof.

The solvent to be used in emulsion polymerization may be water or a solvent mixture of water and an alcohol, for example.

Examples of the polymerization initiator include oil-soluble radical polymerization initiators represented by peroxycarbonates such as diisopropyl peroxydicarbonate (IPP) and di-n-propyl peroxydicarbonate (NPP), and water-soluble radical polymerization initiators such as ammonium salts, potassium salts, and sodium salts of persulfuric acid, perboric acid, perchloric acid, perphosphoric acid, or percarbonic acid. In emulsion polymerization, ammonium persulfate or potassium persulfate is particularly preferred.

The surfactant may be any usually used surfactant, and examples thereof include nonionic surfactants, anionic surfactants, and cationic surfactants. The surfactant may be a fluorosurfactant.

Examples of the dispersant to be used in suspension polymerization include partially saponified polyvinyl acetate that is used in usual suspension polymerization; water-soluble cellulose ethers such as methyl cellulose, hydroxyethyl cellulose, hydroxypropyl cellulose, and hydroxypropyl methyl cellulose; and water-soluble polymers such as acrylic polymers and gelatin. Suspension polymerization is performed with a water/monomer weight ratio of 1.5/1 to 3/1, and the dispersant is used in an amount of 0.01 to 0.1 parts by mass for 100 parts by mass of the monomer. If necessary, a pH buffer such as a polyphosphate may be used.

Examples of the chain-transfer agent include hydrocarbons such as ethane, isopentane, n-hexane, and cyclohexane; aromatic compounds such as toluene and xylene; ketones such as acetone; acetates such as ethyl acetate and butyl acetate; alcohols such as methanol and ethanol; mercaptans such as methyl mercaptan; and halogenated hydrocarbons such as carbon tetrachloride, chloroform, methylene chloride, and methyl chloride.

The amount of the chain-transfer agent to be added may vary in accordance with the chain transfer constant of the compound to be used, and it is usually in a range from 0.001 to 10 mass % relative to the polymerization solvent.

The polymerization temperature only needs to be within a range that enables a substantially constant compositional ratio between the fluoroolefin and the vinyl ester monomer during the reaction. The polymerization temperature may be 0° C. to 100° C.

The polymerization pressure only needs to be within a range that enables a substantially constant compositional ratio between the fluoroolefin and the vinyl ester monomer during the reaction. The polymerization pressure may be 0 to 10 MPaG.

Hydroxylation of an acetate group derived from vinyl acetate has been well known, and can be achieved by a conventionally known method such as alcoholysis or hydrolysis with an acid or a base. Hydrolysis with a base is generally called saponification. Still, the hydroxylation of the vinyl ester monomer hereinafter is called saponification regardless of the hydroxylating method. This saponification converts the acetate group (—OCOCH$_3$) into a hydroxy group (—OH). Other vinyl ester monomers can also be saponified to have a hydroxy group by a conventionally known method.

In the case of providing the fluorine-containing polymer (I) in the present invention by saponifying a copolymer including a fluoroolefin unit and a vinyl ester monomer unit, the degree of saponification has only to be within a range that enables the monomer unit contents of the fluorine-containing polymer (I) in the present invention to be within the above respective ranges. Specifically, the degree of saponification is preferably 50% or higher, more preferably 60% or higher, still more preferably 70% or higher.

The degree of saponification can be calculated by the following formula by IR measurement or $^1$H-NMR measurement on the fluorine-containing polymer (I).

$$\text{Degree of saponification (\%)} = D/(D+E) \times 100$$

wherein

D: number of vinyl alcohol units in fluorine-containing polymer (I),

E: number of vinyl ester monomer units in fluorine-containing polymer (I).

The fluorine-containing polymer (I) in the present invention can also be obtained by a production method including the steps of: copolymerizing a fluoroolefin and a vinyl ether monomer ($CH_2=CH-OR$) (hereinafter, simply referred to as a vinyl ether monomer) coupled with a protecting group (R) which may be converted into a vinyl alcohol by a deprotection reaction to provide a fluoroolefin/vinyl ether monomer copolymer; and deprotecting the fluoroolefin/vinyl ether monomer copolymer to provide a fluoroolefin/vinyl alcohol copolymer.

Methods of copolymerizing a fluoroolefin and a vinyl ether monomer and methods of deprotecting a fluoroolefin/vinyl ether monomer copolymer have been well known, and conventionally known methods may be used also in the present invention. The deprotection reaction on the fluoroolefin/vinyl ether monomer copolymer converts, for example, a protecting alkoxy group into a hydroxy group to provide a fluoroolefin/vinyl alcohol copolymer.

The fluoroolefin/vinyl ether monomer copolymer obtained by copolymerizing a fluoroolefin and a vinyl ether monomer preferably satisfies a mole ratio between the fluoroolefin and the vinyl ether monomer (fluoroolefin/vinyl ether monomer) of (40 to 60)/(60 to 40), more preferably (45 to 55)/(55 to 45). The copolymer satisfying the mole ratio within the above range and the degree of deprotection to be mentioned below within the following range is capable of providing the fluorine-containing polymer (I) in which the mole ratio between the respective polymerized units is within the above range.

The deprotection of the fluoroolefin/vinyl ether copolymer is preferably performed such that the degree of deprotection is 1 to 100%, more preferably 30 to 100%.

The degree of deprotection can be determined by measuring, before and after the deprotection, the integral value of the protons of a tertiary-butyl group ($-(CH_3)_3$) around 1.0 to 1.3 ppm and the integral value of the protons of a main-chain methylene group ($-CH_2-CH-$) within the range of 2.2 to 2.7 ppm by $^1$H-NMR.

$^1$H-NMR: GEMINI-300 (Varian, Inc.)

The vinyl ether monomer is preferably free from a fluorine atom. The vinyl ether monomer may be any monomer to be deprotected. For easy availability, t-butyl vinyl ether is preferred.

The fluorine-containing polymer (I) including a fluoroolefin unit, a vinyl alcohol unit, and a vinyl ether unit preferably has an alternation rate between the fluoroolefin unit and the vinyl alcohol or vinyl ether unit of lower than 95%. The polymer (I) having an alternation rate within this range may effectively have high solubility in a solvent. The alternation rate is preferably 30% or higher, more preferably 35% or higher, still more preferably 40% or higher. Too low an alternation rate is not preferred because it may cause poor heat resistance.

The alternation rate between the fluoroolefin unit and the vinyl alcohol or vinyl ether unit can be calculated as an alternation rate of three units by the following formula using a solvent such as hexadeuteroacetone capable of dissolving the fluorine-containing polymer (I) by $^1$H-NMR measurement on the fluorine-containing polymer (I).

$$\text{Alternation rate (\%)}=C/(A+B+C)\times 100$$

wherein

A: number of V units bonded to two V units, for example, in the form of -V-V-V-, B: number of V units bonded to one V unit and one T unit, for example, in the form of -V-V-T-, C: number of V units bonded to two T units, for example, in the form of -T-V-T-, (T: fluoroolefin unit, V: vinyl alcohol or vinyl ether unit).

The number of V units in each of A, B, and C is calculated from the intensity ratio of H in the main chain bonded to a tertiary carbon atom in the vinyl alcohol unit ($-CH_2-CH(OH)-$) and the vinyl ether unit ($-CH_2-CH(OR)$) in the $^1$H-NMR measurement. The intensity ratio of H in the main chain was estimated by $^1$H-NMR measurement with a fluorine-containing polymer before hydroxylation.

The fluoroolefin and the vinyl ether monomer may be copolymerized by solution polymerization, bulk polymerization, emulsion polymerization, suspension polymerization, or the like. Preferred is emulsion polymerization, solution polymerization, or suspension polymerization because these methods are industrially easy to perform, but the method is not limited thereto.

In emulsion polymerization, solution polymerization, or suspension polymerization, additives such as a polymerization initiator, a solvent, a chain-transfer agent, a surfactant, and a dispersant may be used, and they may be ones usually used.

The solvent to be used in solution polymerization is preferably one capable of dissolving the fluoroolefin and the vinyl ether monomer, as well as the fluorine-containing polymer (I) to be synthesized. Examples thereof include esters such as n-butyl acetate, t-butyl acetate, ethyl acetate, methyl acetate, and propyl acetate; ketones such as acetone, methyl ethyl ketone, and cyclohexanone; aliphatic hydrocarbons such as hexane, cyclohexane, and octane; aromatic hydrocarbons such as benzene, toluene, and xylene; alcohols such as methanol, ethanol, t-butanol, and isopropanol; cyclic ethers such as tetrahydrofuran and dioxane; fluorosolvents such as HCFC-225; dimethyl sulfoxide, dimethyl formamide, and any mixture thereof.

The solvent to be used in emulsion polymerization may be water or a solvent mixture of water and an alcohol, for example.

Examples of the polymerization initiator include oil-soluble radical polymerization initiators represented by peroxycarbonates such as diisopropyl peroxydicarbonate (IPP) and di-n-propyl peroxydicarbonate (NPP), and water-soluble radical polymerization initiators such as ammonium salts, potassium salts, and sodium salts of persulfuric acid, perboric acid, perchloric acid, perphosphoric acid, or percarbonic acid. In emulsion polymerization, ammonium persulfate or potassium persulfate is particularly preferred.

The surfactant may be any usually used surfactant, and examples thereof include nonionic surfactants, anionic surfactants, and cationic surfactants. The surfactant may be a fluorosurfactant.

Examples of the dispersant to be used in suspension polymerization include partially saponified polyvinyl acetate that is used in usual suspension polymerization; water-soluble cellulose ethers such as methyl cellulose, hydroxyethyl cellulose, hydroxypropyl cellulose, and hydroxypropyl methyl cellulose; and water-soluble polymers such as acrylic polymers and gelatin. Suspension polymerization is performed with a water/monomer weight ratio of 1.5/1 to 3/1, and the dispersant is used in an amount of 0.01 to 0.1 parts by mass for 100 parts by mass of the monomer. If necessary, a pH buffer such as a polyphosphate may be used.

Examples of the chain-transfer agent include hydrocarbons such as ethane, isopentane, n-hexane, and cyclohexane;

aromatic compounds such as toluene and xylene; ketones such as acetone; acetates such as ethyl acetate and butyl acetate; alcohols such as methanol and ethanol; mercaptans such as methyl mercaptan; and halogenated hydrocarbons such as carbon tetrachloride, chloroform, methylene chloride, and methyl chloride.

The amount of the chain-transfer agent to be added may vary in accordance with the chain transfer constant of the compound to be used, and it is usually in a range from 0.001 to 10 mass % relative to the polymerization solvent.

The polymerization temperature only needs to be within a range that enables a substantially constant compositional ratio between the fluoroolefin and the vinyl ether monomer during the reaction. The polymerization temperature may be 0° C. to 100° C.

The polymerization pressure only needs to be within a range that enables a substantially constant compositional ratio between the fluoroolefin and the vinyl ether monomer during the reaction. The polymerization pressure may be 0 to 10 MPaG.

The deprotection of the vinyl ether monomer may be performed by a conventionally known method utilizing an acid, heat, or light, for example. This deprotection converts the leaving group (e.g., $-C(CH_3)_3$) into hydrogen, so that a hydroxy group can be formed.

In the case of providing the fluorine-containing polymer (I) in the present invention by deprotecting a copolymer including a fluoroolefin unit and a vinyl ether monomer unit, the degree of deprotection only needs to be within a range that enables the monomer unit contents of the fluorine-containing polymer (I) in the present invention to be within the above respective ranges. Specifically, the degree of deprotection is preferably 50% or higher, more preferably 60% or higher, still more preferably 70% or higher.

The degree of deprotection can be calculated by the following formula by IR measurement or the aforementioned $^1$H-NMR measurement on the fluorine-containing polymer (I).

Degree of deprotection (%)=$D/(D+E) \times 100$ wherein
D: number of vinyl alcohol units in fluorine-containing polymer (I),
E: number of vinyl ether monomer units in fluorine-containing polymer (I).

The fluorine-containing polymer in the present invention is also preferably a fluorine-containing polymer (hereinafter, also referred to as a fluorine-containing polymer (II)) including a unit based on a monomer (hereinafter, also referred to as a monomer (1)) represented by the following formula (1):

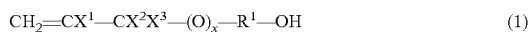

$$CH_2=CX^1-CX^2X^3-(O)_x-R^1-OH \quad (1)$$

(wherein $X^1$, $X^2$, and $X^3$ may be the same as or different from each other, and are each H, F, or a fluoroalkyl group; $R^1$ is a divalent organic group which may optionally have an ether bond; and x is 0 or 1). Use of the fluorine-containing polymer (II) provides a cured product having a lower refractive index.

$X^1$, $X^2$, and $X^3$ in the formula (1) may be the same as or different from each other, and are each H, F, or a fluoroalkyl group. The fluoroalkyl group preferably has a carbon number of 1 to 5, more preferably 1 to 3, still more preferably 1 or 2. Examples of the fluoroalkyl group include $-CF_3$ and $-CF_2CF_3$.

$X^1$, $X^2$, and $X^3$ are preferably F.

$R^1$ in the formula (1) is a divalent organic group which may optionally have an ether bond. The organic group preferably has a carbon number of 1 to 20, more preferably 1 to 15, still more preferably 2 to 10. The organic group preferably has a fluorine atom. The organic group is more preferably a fluoroalkylene group which may optionally have an ether bond, still more preferably a fluoroalkylene group having an ether bond.

Specific examples of $R^1$ include $-CF(CF_3)-(CF_2-O-CF(CF_3))_n-CH_2-$ (where n is an integer of 0 to 10). Preferred are $-CF(CF_3)-CF_2-O-CF(CF_3)-CH_2-$, $-CF(CF_3)-CH_2-$, and $-CF(CF_3)-CF_2-O-CF(CF_3)-CF_2-O-CF(CF_3)-CH_2-$.

In the formula (1), x is 0 or 1. Preferably, x is 1.

Specific examples of the monomer (1) include $CH_2=CF-CF_2-O-CF(CF_3)-CF_2-O-CF(CF_3)-CH_2-OH$, $CH_2=CF-CF_2-O-CF(CF_3)-CH_2-OH$, $CH_2=CF-CF_2-O-CF(CF_3)-(CF_2-O-CF(CF_3))_2-CH_2-OH$, and $CH_2=CF-CF_2-O-CF(CF_3)-(CF_2-O-CF(CF_3))_3-CH_2-OH$.

Preferred are $CH_2=CF-CF_2-O-CF(CF_3)-CF_2-O-CF(CF_3)-CH_2-OH$ and $CH_2=CF-CF_2-O-CF(CF_3)-CH_2-OH$.

The fluorine-containing polymer (II) preferably includes 40 to 100 mol %, more preferably 60 to 100 mol %, still more preferably 80 to 100 mol %, of a unit based on the monomer (1) (monomer (1) unit).

The fluorine-containing polymer (II) may consist of the monomer (1) unit, or may further include a unit based on a monomer copolymerizable with the monomer (1).

The monomer copolymerizable with the monomer (1) is preferably a fluoroolefin (excluding the monomer (1)). Examples of the fluoroolefin include the fluoroolefins mentioned for the fluorine-containing polymer (I). At least one selected from the group consisting of TFE, CTFE, and HFP is more preferred, and TFE is still more preferred.

With respect to the monomer unit contents in the fluorine-containing polymer (II) including a unit based on a fluoroolefin, preferably, the monomer (1) unit content is 40 mol % or more and 99 mol % or less and the fluoroolefin unit content is 1 mol % or more and 60 mol % or less; more preferably, the monomer (1) unit content is 60 mol % or more and 99 mol % or less and the fluoroolefin unit content is 1 mol % or more and 40 mol % or less; still more preferably the monomer (1) unit content is 80 mol % or more and 99 mol % or less and the fluoroolefin unit content is 1 mol % or more and 20 mol % or less.

The monomer copolymerizable with the monomer (1) may be a monomer free from a fluorine atom. The monomer free from a fluorine atom is preferably at least one fluorine-free ethylenic monomer selected from the group consisting of ethylene, propylene, 1-butene, 2-butene, vinyl chloride, vinylidene chloride, vinyl ether monomers, and unsaturated carboxylic acids.

The total amount of the unit(s) based on the monomer free from a fluorine atom is preferably 0 to 50 mol %, more preferably 0 to 40 mol %, still more preferably 0 to 30 mol %, in all the monomer units of the fluorine-containing polymer (II).

In the description, the amounts of the monomer units constituting the fluorine-containing polymer (II) can be calculated by any combination of NMR, FT-IR, and elemental analysis in accordance with the types of the monomers.

The fluorine-containing polymer (II) may have any weight average molecular weight, and the weight average molecular weight is preferably 9,000 or more, more preferably 10,000 or more. The weight average molecular weight is still more preferably 20,000 to 2,000,000, particularly preferably 30,000 to 1,000,000.

The weight average molecular weight can be determined by gel permeation chromatography (GPC).

The curable composition of the present invention contains an epoxy compound. The epoxy compound may be a compound having one or more, preferably two or more oxirane rings in the molecule. The epoxy compound may be preferably a compound having, in the molecule, two or more groups each of which is at least one selected from the group consisting of a group represented by the following formula (2-1):

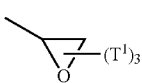
(2-1)

(wherein T$^1$s may be the same as or different from each other, and are each H, F, an alkyl group which may optionally have a substituent, or a fluoroalkyl group which may optionally have a substituent), and a group represented by the following formula (2-2):

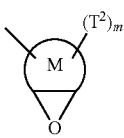
(2-2)

(wherein M is an aliphatic ring or a heteroaliphatic ring; T$^2$s may be the same as or different from each other, and are each H, F, an alkyl group which may optionally have a substituent, or a fluoroalkyl group which may optionally have a substituent; and m is an integer of 3 or greater).

In the group represented by the formula (2-1), T$^1$s may be the same as or different from each other, and are each H, F, an alkyl group which may optionally have a substituent, or a fluoroalkyl group which may optionally have a substituent. The alkyl group of the "alkyl group which may optionally have a substituent" may be a C1-C12 linear, branched, or cyclic alkyl group. Examples thereof include a methyl group, an ethyl group, an n-propyl group, an isopropyl group, an n-butyl group, a sec-butyl group, an isobutyl group, a t-butyl group, a pentyl group, a cyclopentyl group, a hexyl group, a cyclohexyl group, an octyl group, and a cyclodecyl group. Preferred is a C1-C8 alkyl group.

The substituent of the "alkyl group which may optionally have a substituent" may be any substituent that has no adverse effect on the performance of the fluorine-containing polymer in the present invention. Examples thereof include —OH, —COOH, —COOCH$_3$, —NH$_2$, and —COOCH$_2$CH$_3$.

If the alkyl group which may optionally have a substituent has a substituent, the alkyl group may have one substituent or two or more substituents. For example, the alkyl group may be substituted with one to three substituents each of which is at least one substituent as mentioned above.

The fluoroalkyl group of the "fluoroalkyl group which may optionally have a substituent" for T$^1$ may be a C1-C12 linear, branched, or cyclic fluoroalkyl group. Examples thereof include —CF$_3$, —CH$_2$CF$_3$, —CH$_2$CF$_2$CF$_3$, and —CF$_2$CF$_2$CF$_3$. Preferred is a C1-C8 fluoroalkyl group.

The substituent of the "fluoroalkyl group which may optionally have a substituent" for T$^1$ may be any substituent that does not impair the effects of the present invention. Examples thereof include —OH, —COOH, —COOCH$_3$, —NH$_2$, —COOCH$_2$CH$_3$, and —COOCH$_2$CF$_3$.

If the fluoroalkyl group which may optionally have a substituent has a substituent, the fluoroalkyl group may have one substituent or two or more substituents. For example, the fluoroalkyl group may be substituted with one to three substituents each of which is at least one substituent as mentioned above.

Specific examples of the group represented by the formula (2-1) include groups represented by the following formulas.

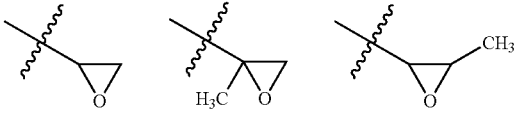
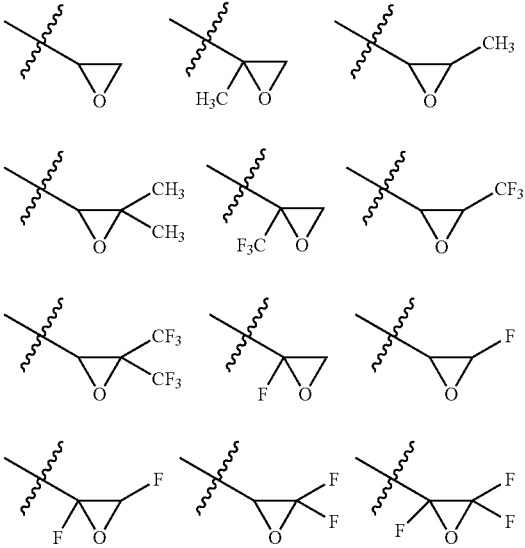

The group represented by the formula (2-1) is preferably any of groups represented by the following formulas.

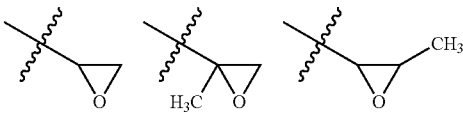

For good reactivity, the group represented by the formula (2-1) is more preferably the group represented by the following formula.

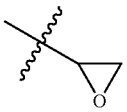 [SMILES: *C1CO1]

In the group represented by the formula (2-2), M is an aliphatic ring or a heteroaliphatic ring; T$^2$s may be the same as or different from each other, and are each H, F, an alkyl group which may optionally have a substituent, or a fluoroalkyl group which may optionally have a substituent; and m is an integer of 3 or greater.

The aliphatic ring and the heteroaliphatic ring for M each have a carbon number of usually 3 to 100, preferably 3 to 50, more preferably 3 to 20.

The hetero atom constituting the heteroaliphatic ring may be at least one selected from the group consisting of an oxygen atom, a nitrogen atom, and a sulfur atom, for example.

$T^2$s may be the same as or different from each other, and are each H, F, an alkyl group which may optionally have a substituent, or a fluoroalkyl group which may optionally have a substituent. The alkyl group of the "alkyl group which may optionally have a substituent" may be a C1-C12 linear, branched, or cyclic alkyl group. Examples thereof include a methyl group, an ethyl group, an n-propyl group, an isopropyl group, an n-butyl group, a sec-butyl group, an isobutyl group, a t-butyl group, a pentyl group, a cyclopentyl group, a hexyl group, a cyclohexyl group, an octyl group, and a cyclodecyl group. Preferred is a C1-C8 alkyl group.

The substituent of the "alkyl group which may optionally have a substituent" may be any substituent that has no adverse effect on the performance of the fluorine-containing polymer in the present invention. Examples thereof include —OH, —COOH, —COOCH$_3$, —NH$_2$, and —COOCH$_2$CH$_3$.

If the alkyl group which may optionally have a substituent has a substituent, the alkyl group may have one substituent or two or more substituents. For example, the alkyl group may be substituted with one to three substituents each of which is at least one substituent as mentioned above.

The fluoroalkyl group of the "fluoroalkyl group which may optionally have a substituent" for $T^2$ may be a C1-C12 linear, branched, or cyclic fluoroalkyl group. Examples thereof include —CF$_3$, —CH$_2$CF$_3$, —CH$_2$CF$_2$CF$_3$, and —CF$_2$CF$_2$CF$_3$. Preferred is a C1-C8 fluoroalkyl group.

The substituent of the "fluoroalkyl group which may optionally have a substituent" for $T^2$ may be any substituent that has no adverse effect on the performance of the fluorine-containing polymer in the present invention. Examples thereof include —OH, —COOH, —COOCH$_3$, —NH$_2$, —COOCH$_2$CH$_3$, and —COOCH$_2$CF$_3$.

If the fluoroalkyl group which may optionally have a substituent has a substituent, the fluoroalkyl group may have one substituent or two or more substituents. For example, the fluoroalkyl group may be substituted with one to three substituents each of which is at least one substituent as mentioned above.

In the formula, m is an integer of 3 or greater. The number for m depends on factors such as the number of carbon atoms constituting the aliphatic ring or the heteroaliphatic ring for M, and the number and the type(s) of hetero atoms.

The group represented by the formula (2-2) is preferably any of groups represented by the following formulas:

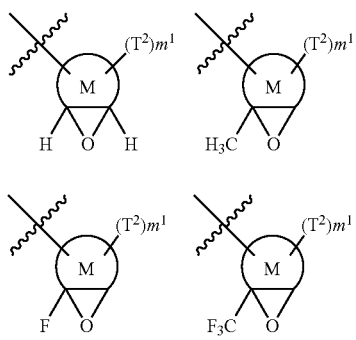

wherein M and $T^2$s are defined in the same manner as in the formula (2-2); $m^1$ is an integer of 3 or greater, the number for $m^1$ depends on factors such as the number of carbon atoms constituting the aliphatic ring or the heteroaliphatic ring for M, and the number and the type(s) of hetero atoms.

For good reactivity, the group represented by the formula (2-2) is more preferably the group represented by the following formula:

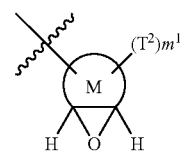

wherein M, $T^2$s, and $m^1$ are defined in the same manner as in the above formulas.

More specific examples of the group represented by the formula (2-2) include groups represented by the following formulas.

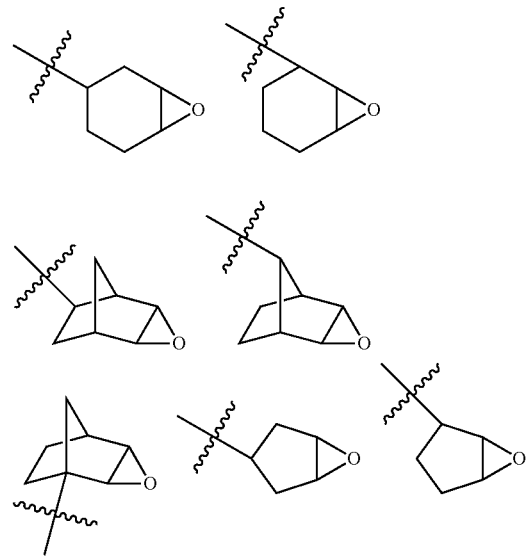

In order to achieve good reactivity and to impart mechanical strength to the resulting cured product, the group represented by the formula (2-2) is preferably any of groups represented by the following formulas.

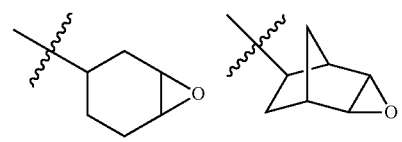 [SMILES: *C1CCC2OC2C1 ; *C1CC2CC1C1OC21]

Examples of the epoxy compound include bisphenol A-type epoxy resin, bisphenol F-type epoxy resin, hydrogenated bisphenol A-type epoxy resin, cresol novolac-type epoxy resin, alicyclic epoxy resin, alkyl glycidyl ethers, and alkylene glycol glycidyl ethers. These compounds may be used alone or in combination of two or more.

Specific examples of the epoxy compound include the following compounds.

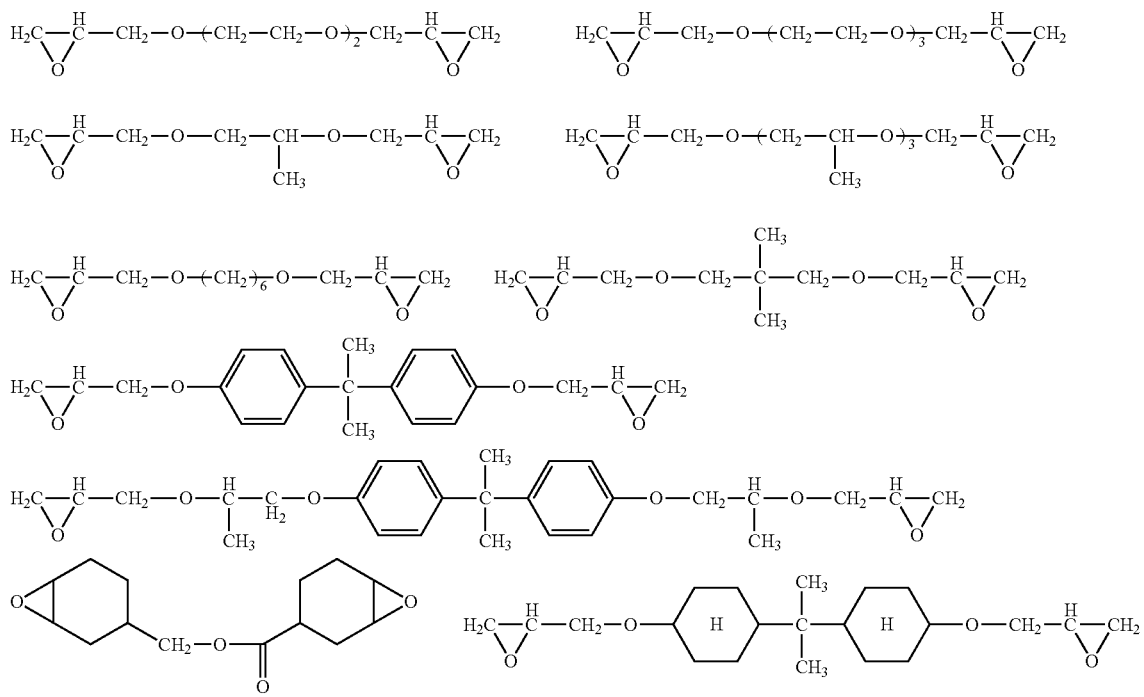

Further, a 1,2-epoxy-4-(2-oxiranyl)cyclohexane adduct of 2,2-bis(hydroxymethyl)-1-butanol represented by the following formula:

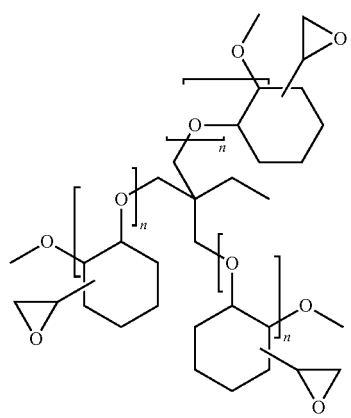

(wherein n is about 1) may also be used. In addition, bisphenol A-type solid epoxy resin, bisphenol F-type solid epoxy resin, hydrogenated bisphenol A-type solid epoxy resin, and others may also be used. These compounds may be used alone or in combination of two or more. Examples of commercially available products of these epoxy compounds include EHPE-3150 (Daicel Corp.), Epikote 1007 (Mitsubishi Chemical Corp.), Epikote 4007 (Mitsubishi Chemical Corp.), and YL7170 (Mitsubishi Chemical Corp.).

Examples of the epoxy compound further include C2-C25 alkyl monoglycidyl ethers such as butyl glycidyl ether and 2-ethylhexyl glycidyl ether, as well as butanediol diglycidyl ether, 1,6-hexanediol diglycidyl ether, neopentyl glycol diglycidyl ether, dodecanediol diglycidyl ether, pentaerythritol polyglycidyl ether, trimethylolpropane polyglycidyl ether, glycerol polyglycidyl ether, phenyl glycidyl ether, resorcin diglycidyl ether, p-t-butylphenyl glycidyl ether, allyl glycidyl ether, tetrafluoropropyl glycidyl ether, octafluoropentyl glycidyl ether, dodecafluorooctyl diglycidyl ether, styrene oxide, limonene diepoxide, limonene monooxide, α-pinene epoxide, β-pinene epoxide, cyclohexene epoxide, cyclooctene epoxide, and vinyl cyclohexene dioxide.

Specific examples of the alicyclic epoxy resin further include those represented by the following formulas:

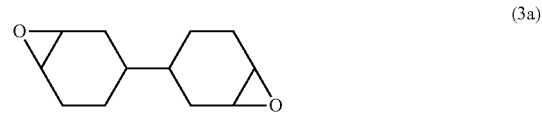

(3a)

(3b)

(3c)

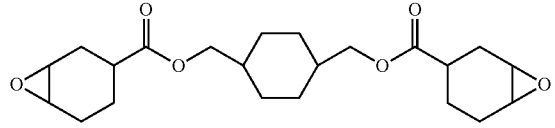

(3d)

(3e)

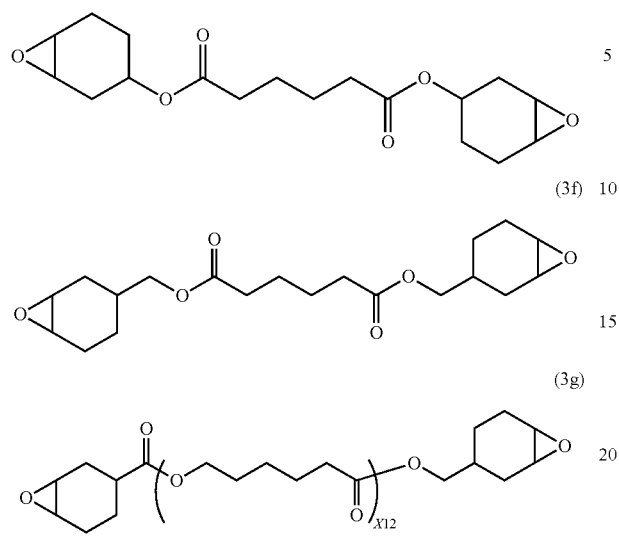

(3f)

(3g)

wherein X12 is an integer of 1 to 40.

Examples of the epoxy compound also include fluoroepoxy resins disclosed in JP 2011-148878 A and JP 2511287 B.

Examples of the fluoroepoxy resins include fluorinated multifunctional epoxy resins represented by the following formulas (I) to (IV):

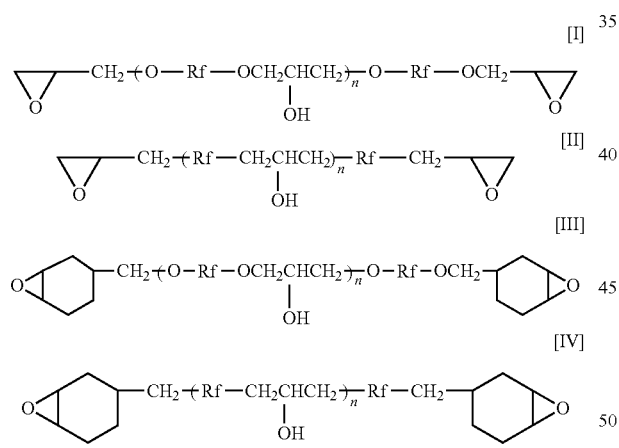

wherein Rf is an alicyclic hydrocarbon group represented by any of the following formulas:

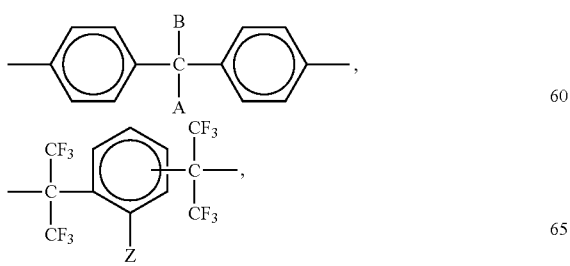

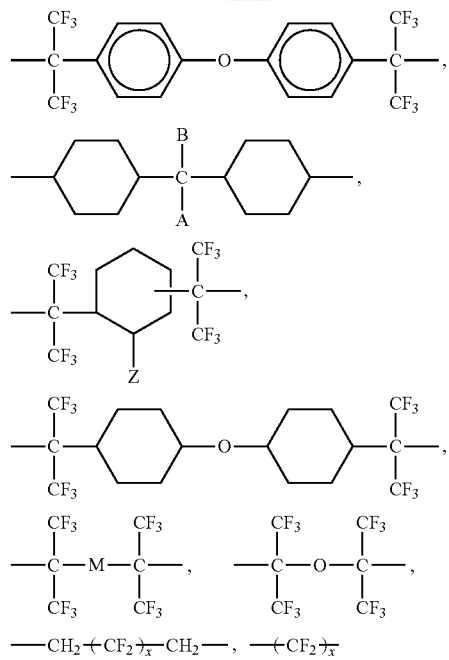

(wherein A is a fluorine-containing organic group represented by the following formula:

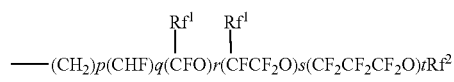

(wherein $Rf^1$ is a C1-C10 perfluoroalkyl group; $Rf^2$ is a C1-C12 perfluoroalkyl group; p is an integer of 0 to 3; q is an integer of 0 to 3; r is 0 or 1; s is an integer of 0 to 5; and t is an integer of 0 to 5); B is the same as A or a hydrogen atom, a C1-C8 alkyl group, or a C1-C8 fluoroalkyl group; Z is a hydrogen atom or a C1-C18 fluoroalkyl group; M is an alicyclic hydrocarbon group represented by any of the following formulas:

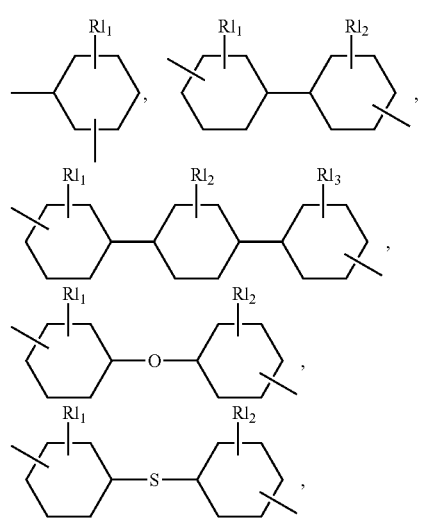

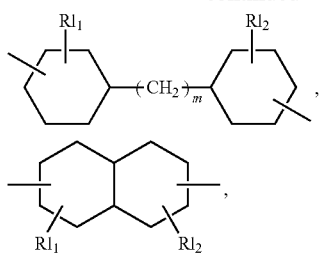

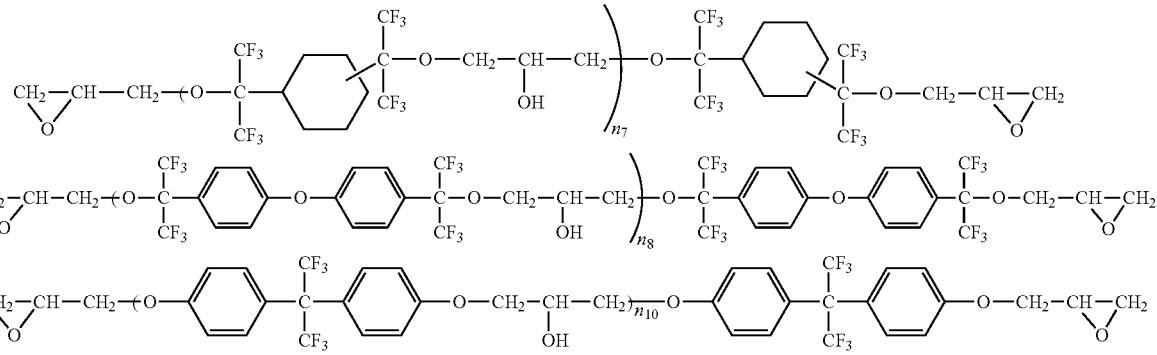

Specific examples of the fluoroepoxy resin include those represented by the following formulas:

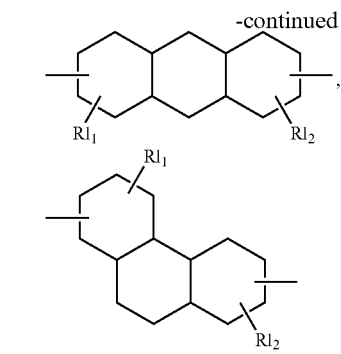

m = 1~10

(wherein Rs may be the same as or different from each other, and are each a C1-C5 alkyl group, OH, CH$_3$, NH$_2$, a halogen atom, or a C1-C20 fluoroalkyl group; l$_1$, l$_2$, and l$_3$ are each 0 or an integer of 1 to 10, which represent the number of substituents R); and x is an integer of 1 to 36); and n is 0 or any positive number.

Rf in the formulas (I) to (IV) is preferably any of the groups represented by the following formulas.

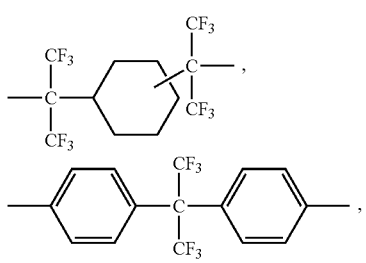

wherein n7, n8, and n10 are each 0 or any positive number. Use of the fluoroepoxy resin is preferred because the refractive index of a cured product is lowered.

The epoxy compound is preferably a compound capable of dissolving the fluorine-containing polymer. The epoxy compound capable of dissolving the fluorine-containing polymer enables the curable composition of the present invention to be a solvent-free curable composition to be mentioned later. From this point of view, preferably, the epoxy compound is in a liquid state at 25° C. and has a ratio of the dispersion component, the polarity component, and the hydrogen bonding component of the solubility parameter within the range defined by the point A (86, 7, 7), the point B (70, 25, 5), the point C (50, 25, 25), the point D (50, 5, 45), and the point E (82, 5, 13), illustrated in FIG. 1.

FIG. 1 is a ternary diagram indicating the ratio of the dispersion component, the polarity component, and the hydrogen bonding component of the solubility parameter of the epoxy compound.

In the present invention, the solubility parameter (SP value) is represented by the following equation.

(SP value)$^2$=(dispersion component)$^2$+(polarity component)$^2$+(hydrogen bonding component)$^2$ Each epoxy compound has an inherent dispersion component value, polarity component value, and hydrogen bonding component value. In the present invention, these values are those disclosed in the following document.

D. W. Van Krevelen, "Properties of Polymers", 3$^{rd}$ Ed., Elsevier Science B.V., 1990

The document provides a technique in which the target epoxy compound is divided into atomic groups, the parameters of the respective atomic groups are determined, and then the SP value of the whole compound is calculated by the parameters of the respective atomic groups. The SP values of the respective epoxy compounds were calculated by this technique of Van Krevelen.

Surprisingly, the inventors found that use of an epoxy compound in a liquid state at 25° C. and having a ratio of the dispersion component, the polarity component, and the hydrogen bonding component within the range defined by the point A, the point B, the point C, the point D, and the point E in the ternary diagram of FIG. 1 enables dissolution of the fluorine-containing polymer in the epoxy compound, providing a solvent-free curable composition to be mentioned later. Since containing no organic solvent, the solvent-free curable composition is capable of providing a cured product having excellent physical properties, and advantageously less causes an adverse effect on the environment.

Examples of the epoxy compound in a liquid state at 25° C. and having a ratio within the range defined by the point A, the point B, the point C, the point D, and the point E illustrated in FIG. 1 include the following compounds.

and the point E illustrated in FIG. 1 is selected, and the amount of the epoxy compound is adjusted to 1000 parts by mass for 100 parts by mass of the fluorine-containing polymer. Such adjustment of the configuration within the above range enables adjustment of the viscosity of the composition to a required value.

Further, surprisingly, the inventors found that even a compound belonging to the group (p) of epoxy compounds having a ratio outside the range defined by the point A, the point B, the point C, the point D, and the point E in the ternary diagram of FIG. 1 is dissolved in a solvent-free curable composition that includes any of the aforementioned compounds belonging to the group (a) of epoxy compounds having a ratio within the range defined by the point A, the point B, the point C, the point D, and the point E and the fluorine-containing polymer, providing a uniform composition. In other words, the inventors found that a uniform

TABLE 1

| Formula | SP value | Dispersion | Polarity | Hydrogen bonding | Dispersion % | Polarity % | Hydrogen bonding % |
|---|---|---|---|---|---|---|---|
| $H_2C(O)CH-CH_2-O-(CH_2-CH_2-O)_2-CH_2-CH(O)CH_2$ | 23.3 | 19.3 | 8.23 | 10.1 | 68.7 | 12.4 | 18.9 |
| $H_2C(O)CH-CH_2-O-(CH_2-CH_2-O)_3-CH_2-CH(O)CH_2$ | 22.1 | 19.0 | 7.62 | 8.12 | 74.5 | 11.9 | 13.6 |
| $H_2C(O)CH-CH_2-O-CH_2-CH(CH_3)-O-CH_2-CH(O)CH_2$ | 22.2 | 19.1 | 8.96 | 6.90 | 74.0 | 16.3 | 9.7 |
| $H_2C(O)CH-CH_2-O-(CH_2-CH(CH_3)-O)_3-CH_2-CH(O)CH_2$ | 20.3 | 18.0 | 6.00 | 7.21 | 78.6 | 8.8 | 12.6 |
| $H_2C(O)CH-CH_2-O-(CH_2)_6-O-CH_2-CH(O)CH_2$ | 20.7 | 18.7 | 6.49 | 5.87 | 82.0 | 9.9 | 8.1 |
| $H_2C(O)CH-CH_2-O-CH_2-C(CH_3)_2-CH_2-O-CH_2-CH(O)CH_2$ | 21.6 | 18.9 | 8.00 | 6.51 | 77.1 | 13.7 | 9.1 |
| (diepoxycyclohexyl compound with -CH₂-O-C(=O)- linker) | 25.2 | 23.0 | 7.28 | 7.37 | 83.1 | 8.3 | 8.6 |

The amount of the epoxy compound is preferably 1 to 10000 parts by mass for 100 parts by mass of the fluorine-containing polymer. The upper limit of the amount of the epoxy compound is more preferably 2000 parts by mass, still more preferably 1000 parts by mass, particularly preferably 900 parts by mass. The lower limit of the amount of the epoxy compound is more preferably 1 part by mass, still more preferably 5 parts by mass, much more preferably 10 parts by mass, particularly preferably 100 parts by mass, most preferably 150 parts by mass.

In order to prepare the composition as a solvent-free curable composition, preferably, an epoxy compound in a liquid state at 25° C. and having a ratio within the range defined by the point A, the point B, the point C, the point D, solvent-free curable composition can be obtained by dissolving the fluorine-containing polymer in an epoxy compound belonging to the group α at first, and then dissolving the polymer in an epoxy compound belonging to the group β.

Further, surprisingly, the inventors found that, even in the case of using an epoxy compound that is in a solid state at 25° C. and that belongs to the group α, a uniform, transparent solid matter can be obtained by uniformly dissolving the fluorine-containing polymer and an epoxy compound that is in a solid state and that belongs to the group α in an organic solvent, and then evaporating the organic solvent by, for example, casting. One example of such an epoxy compound is the following.

TABLE 2

| Formula | SP value | Dispersion | Polarity | Hydrogen bonding | Dispersion % | Polarity % | Hydrogen bonding % |
|---|---|---|---|---|---|---|---|
| (structure) | 27.5 | 21.9 | 7.24 | 14.9 | 63.8 | 7.0 | 29.2 |

In the formula, n is about 1.

Examples of the epoxy compound having a ratio outside the range defined by the point A, the point B, the point C, the point D, and the point E illustrated in FIG. 1 include the following compounds.

TABLE 3

| Formula | SP value | Dispersion | Polarity | Hydrogen bonding | Dispersion % | Polarity % | Hydrogen bonding % |
|---|---|---|---|---|---|---|---|
| (bisphenol A diglycidyl ether structure) | 22.7 | 21.5 | 5.01 | 5.11 | 90.0 | 4.9 | 5.1 |
| (extended bisphenol A diglycidyl ether structure) | 21.3 | 20.0 | 4.19 | 5.99 | 88.2 | 3.9 | 7.9 |
| (hydrogenated bisphenol A diglycidyl ether structure) | 20.6 | 19.5 | 4.52 | 4.90 | 89.6 | 4.8 | 5.6 |

The curable composition of the present invention preferably contains an acid anhydride. Thereby, the curable composition of the present invention is easily cured by heat, and is capable of providing a cured product having much lower vapor permeability, a much higher elastic modulus, a much lower linear expansion coefficient, a much lower refractive index, and a much lower permittivity.

Examples of the acid anhydride include aromatic acid anhydrides, alicyclic acid anhydrides, and aliphatic acid anhydrides. Specific examples thereof include phthalic anhydride, trimellitic anhydride, pyromellitic anhydride, benzophenone tetracarboxylic anhydride, ethylene glycol bistrimellitate, glycerol tris-trimellitate, maleic anhydride, tetrahydrophthalic anhydride, methyltetrahydrophthalic anhydrides (e.g., 3-methyl-1,2,3,6-tetrahydrophthalic anhydride, 4-methyl-1,2,3,6-tetrahydrophthalic anhydride), endo-methylene tetrahydrophthalic anhydride, methyl endomethylene tetrahydrophthalic anhydride, methylbutenyl tetrahydrophthalic anhydride, dodecenylsuccinic anhydride, hexahydrophthalic anhydride, methylhexahydrophthalic anhydrides (e.g., 3-methyl-hexahydrophthalic anhydride, 4-methyl-hexahydrophthalic anhydride), succinic anhydride, methylcyclohexene dicarboxylic anhydrides, alkylstyrene-maleic anhydride copolymers, chlorendic anhydride, and polyazelaic anhydride.

Preferred among these are 3-methyl-hexahydrophthalic anhydride and 4-methyl-hexahydrophthalic anhydride.

The amount of the acid anhydride is preferably 0.6 to 1.4 equivalents relative to 1 equivalent of the sum (C) (C=A'+B) of the hydroxy equivalents (A') calculated from the hydroxyl value (A) of the fluorine-containing polymer and the epoxy equivalents (B) of the epoxy compound.

This enables production of a cured product having low vapor permeability, a high elastic modulus, a low linear expansion coefficient, a low refractive index, and a low permittivity at more favorable levels.

The upper limit of the equivalents of the acid anhydride is more preferably 1.3 equivalents, still more preferably 1.2 equivalents, particularly preferably 1.1 equivalents. The lower limit of the equivalents of the acid anhydride is more preferably 0.7 equivalents, still more preferably 0.8 equivalents, particularly preferably 0.85 equivalents.

The curable composition of the present invention is preferably a solvent-free curable composition. Specifically, in order to avoid a step of removing a solvent after curing the curable composition and to avoid bad influences due to remaining of the solvent, such as deterioration in heat resistance, deterioration in strength, and cloudiness, the curable composition of the present invention is preferably free from an organic solvent that has no radical reactive group. Specific examples of the organic solvent having no radical reactive group include aliphatic hydrocarbons having no radical reactive group, such as hexane, cyclohexane, heptane, octane, nonane, decane, undecane, dodecane, and mineral spirits; aromatic hydrocarbons having no radical reactive group, such as benzene, toluene, xylene, naphthalene, and solvent naphtha; esters having no radical reactive group, such as methyl acetate, ethyl acetate, propyl acetate, n-butyl acetate, isobutyl acetate, isopropyl acetate, isobutyl acetate, cellosolve acetate, propylene glycol methyl ether acetate, carbitol acetate, diethyl oxalate, ethyl pyruvate, ethyl-2-hydroxybutylate, ethyl acetoacetate, amyl acetate, methyl lactate, ethyl lactate, methyl 3-methoxypropionate, ethyl 3-methoxypropionate, methyl 2-hydroxyisobutyrate, and ethyl 2-hydroxyisobutyrate; ketones having no radical reactive group, such as acetone, methyl ethyl ketone, cyclohexanone, methyl isobutyl ketone, 2-hexanone, cyclohexanone, methyl amino ketone, and 2-heptanone; glycol ethers having no radical reactive group, such as ethyl cellosolve, methyl cellosolve, methyl cellosolve acetate, ethyl cellosolve acetate, propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, dipropylene glycol dimethyl ether, and ethylene glycol monoalkyl ethers; alcohols having no radical reactive group, such as methanol, ethanol, iso-propanol, n-butanol, isobutanol, t-butanol, sec-butanol, 3-pentanol, octyl alcohol, 3-methyl-3-methoxybutanol, and t-amyl alcohol; cyclic ethers having no radical reactive group, such as tetrahydrofuran, tetrahydropyran, and dioxane; amides having no radical reactive group, such as N,N-dimethyl formamide and N,N-dimethyl acetamide; ether alcohols having no radical reactive group, such as methyl cellosolve, cellosolve, isopropyl cellosolve, butyl cellosolve, and diethylene glycol monomethyl ether; and 1,1,2-trichloro-1,2,2-trifluoroethane, 1,2-dichloro-1,1,2,2-tetrafluoroethane, and dimethyl sulfoxide. Further, any solvent mixture of two or more of these solvents may be used.

The organic solvent having no radical reactive group may be a fluorine-based solvent. Examples of the fluorine-based solvent include $CH_3CCl_2F$ (HCFC-141b), $CF_3CF_2CHCl_2$/$CClF_2CF_2CHClF$ mixture (HCFC-225), perfluorohexane, perfluoro(2-butyltetrahydrofuran), methoxy-nonafluorobutane, and 1,3-bistrifluoromethylbenzene, as well as fluorine-based alcohols such as $H(CF_2CF_2)_nCH_2OH$ (wherein n is an integer of 1 to 3), $F(CF_2)_nCH_2OH$ (wherein n is an integer of 1 to 5), and $CF_3CH(CF_3)OH$; and benzotrifluoride, perfluorobenzene, perfluoro(tributylamine), and $ClCF_2CFClCF_2CFCl_2$. Further, any solvent mixture of two or more of these fluorine-based solvents may be used.

The organic solvent having no radical reactive group may be a solvent mixture of any of the above non-fluorine-based solvents and any of the above fluorine-based solvents.

The curable composition of the present invention preferably contains none of the above organic solvents having no radical reactive group.

The curable composition of the present invention preferably further contains a curing accelerator. Thereby, the resulting cured product has excellent transparency. Further, the resulting cured product also has improved hardness.

The curing accelerator may be a curing accelerator (curing catalyst) for epoxy compounds. Examples of the curing accelerator include compounds such as butyl amine, octyl amine, dibutyl amine, monoethanol amine, diethanol amine, triethanol amine, diethylene triamine, triethylene tetramine, oleyl amine, cyclohexyl amine, benzyl amine, diethyl aminopropyl amine, xylylene diamine, triethylene diamine, guanidine, diphenyl guanidine, 2,4,6-tris(dimethylaminomethyl)phenol, morpholine, N-methyl morpholine, and 1,8-diazabicyclo(5.4.0)undecene-7 (DBU), salts of these compounds with, for example, a carboxylic acid, low molecular weight polyamide resins of an excess amount of polyamine and a polybasic acid, reaction products of an excess amount of polyamine and an epoxy compound, tertiary amines, tertiary amine salts, imidazole, phosphine, phosphonium salts, sulfonium salts, thiol compounds, aromatic dimethyl urea, and aliphatic dimethyl urea.

Preferred among these are compounds such as butyl amine, octyl amine, dibutyl amine, monoethanol amine, diethanol amine, triethanol amine, diethylene triamine, triethylene tetramine, oleyl amine, cyclohexyl amine, benzyl amine, diethyl aminopropyl amine, xylylene diamine, triethylene diamine, guanidine, diphenyl guanidine, 2,4,6-tris(dimethylaminomethyl)phenol, morpholine, N-methyl morpholine, and 1,8-diazabicyclo(5.4.0)undecene-7 (DBU), salts of these compounds with, for example, a carboxylic acid, low molecular weight polyamide resins of an excess amount of polyamine and a polybasic acid, and reaction products of an excess amount of polyamine and an epoxy compound, more preferred are 1,8-diazabicyclo(5.4.0)undecene-7 (DBU) and salts thereof.

The above curing accelerators may be used alone, or may be used in combination of two or more. The amount of the curing accelerator is preferably about 0.1 to 10 parts by mass, more preferably 0.5 to 5 parts by mass, relative to 100 parts by mass in total of the fluorine-containing polymer and the epoxy compound.

The curable composition of the present invention may further contain any various additives, if necessary, in addition to the above compounds to the extent that the effects of the present invention are not impaired.

Examples of such additives include reaction inhibitors, leveling agents, viscosity adjusters, photostabilizers, moisture absorbents, pigments, dyes, and reinforcing agents.

Examples of the reaction inhibitors include acetylene alcohols such as 1-ethynyl-1-cyclohexanol, 2-ethynyl isopropanol, 2-methyl-3-butyn-2-ol, 3,5-dimethyl-1-hexyn-3-ol, and 2-phenyl-3-butyn-2-ol; alkenyl siloxanes such as 1,3,5,7-tetravinyl tetramethyl cyclotetrasiloxane; marate compounds such as diallyl fumarate, dimethyl fumarate, and diethyl fumarate; and triallyl cyanurate and triazole. Blending a reaction inhibitor leads to effects such as production of one-part compositions and of providing a sufficiently long pot life (working life) of the resulting composition. This reaction inhibitor may be used in any amount, and is preferably used in an amount corresponding to 10 to 50000 ppm (mass basis) in the composition of the present invention.

As mentioned above, the curable composition of the present invention is preferably of a solvent-free type. Still, the composition may contain an organic solvent for some uses. The organic solvent may be any one that allows the components constituting the curable composition of the present invention to be uniformly dissolved or dispersed therein, and is preferably one that uniformly dissolve the fluorine-containing polymer.

Specific examples thereof include cellosolve solvents such as methyl cellosolve, ethyl cellosolve, methyl cellosolve acetate, and ethyl cellosolve acetate; ester solvents such as diethyl oxalate, ethyl pyruvate, ethyl-2-hydroxybutyrate, ethyl acetoacetate, butyl acetate, isobutyl acetate, propyl acetate, amyl acetate, ethyl butyrate, butyl butyrate, methyl lactate, ethyl lactate, methyl 3-methoxypropionate, ethyl 3-methoxypropionate, methyl 2-hydroxyisobutyrate, and ethyl 2-hydroxyisobutyrate; propylene glycol solvents such as propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, and dipropylene glycol dimethyl ether; ketone solvents such as methyl ethyl ketone, methyl isobutyl ketone, 2-hexanone, cyclohexanone, methyl amino ketone, and 2-heptanone; alcohol solvents such as methanol, ethanol, n-propanol, isopropanol, n-butanol, isobutanol, and isopentyl alcohol; aromatic hydrocarbons such as toluene and xylene, and solvent mixtures of any two or more of these solvents.

In order to improve the solubility of the fluorine-containing polymer, a fluorine-based solvent may be used, if necessary. The fluorine-based solvent may be any of those mentioned above.

For easy application and good productivity in application, general purpose solvents such as ketone solvents, acetic acid ester solvents, alcohol solvents, and aromatic solvents are preferred.

In order to give improved optical properties, such as improved hardness, a lower refractive index, a wider band, and a lower reflectivity, to the resulting cured product in accordance with the uses thereof (e.g., an anti-reflection film or a sealant), the curable composition of the present invention may further contain particles of an inorganic compound.

The inorganic compound in the present invention may be in the form of ultrafine particles or colloidal sol. The amount of the particles of an inorganic compound to be added to the coating film may be about 50 to 75 mass % of the weight of the coating film.

As the proportion of the inorganic compound particles increases, the fluorine-containing component in the cured product is more diluted so that the effect of decreasing the refractive index by the fluorine-containing component is weakened. In contrast, microvoids are formed in the coating film and these microvoids decrease the refractive index of the coating film toward the refractive index of the air. Thus, the fluorine-containing component and the microvoids cooperate to provide a significantly low refractive index material.

Less than 50 mass % of the inorganic compound particles in the cured product relative to the weight of the coating film usually fail to form microvoids in the coating film. The refractive index of the coating film can be reduced mainly by the effect of the fluorine-containing component.

More than 50 mass % of the inorganic compound particles in the cured product relative to the weight of the coating film may form microvoids in the coating film although such formation depends on the composition of the cured product. The refractive index of the coating film can be significantly reduced by the effects of both the fluorine-containing component and the microvoids. If the proportion of the inorganic compound particles in the cured product is more than 75 mass % relative to the weight of the coating film, the effect of reducing the refractive index of the microvoids is relatively strengthened although the effect of the fluorine-containing component still remains. Thus, significant optical properties of the coating film are maintained, but the physical strength thereof decreases.

Any inorganic compound particles or colloidal sol may be used, and a compound having a refractive index of 1.50 or lower is preferred. Specifically preferred are/is particles or colloidal sol of magnesium fluoride (refractive index: 1.38), silicon oxide (refractive index: 1.46), aluminum fluoride (refractive index: 1.33 to 1.39), calcium fluoride (refractive index: 1.44), lithium fluoride (refractive index: 1.36 to 1.37), sodium fluoride (refractive index: 1.32 to 1.34), or thorium fluoride (refractive index: 1.45 to 1.50). In order to secure the transparency of the low refractive index material, the particle size (volume average particle size) of the particles or colloidal sol is preferably sufficiently smaller than the wavelength of the visible light. The particle size is specifically preferably 100 nm or smaller, in particular 50 nm or smaller.

The volume average particle size of the particles can be determined at room temperature using a particle size distribution analyzer (e.g., particle size distribution analyzer 9320HRA, Microtrac) utilizing laser diffraction scattering with the particles being dispersed in an organic solvent such as ethanol.

In order not to deteriorate the dispersion stability in the composition and the adhesion in the low refractive index material, the inorganic compound particles are preferably used in the form of organosol, i.e., dispersed in an organic dispersion medium in advance. Further, in order to improve the dispersion stability of the inorganic compound particles in the composition and the adhesion thereof in the low refractive index material, the surface of the inorganic compound particles may be modified in advance with any of various coupling agents, for example. Examples of the coupling agents include silicon compounds substituted with any organic group; alkoxides of metal such as aluminum, titanium, zirconium, antimony, or any mixture thereof; salts of organic acids; and coordination compounds coupled with any coordinating compound.

The viscosity of the curable composition of the present invention at 30° C. may be adjusted in accordance with the use thereof. For the use as a sealant, for example, the viscosity thereof is preferably 1 mPa·s or higher because the composition with too low a viscosity may easily drip and may be inversely difficult to handle. For good film formability, the viscosity is more preferably 5 mPa·s or higher. For less shrinkage in curing, the viscosity is still more preferably 10 mPa·s or higher. For good handleability, the viscosity is preferably 20000 mPa·s or lower. For spread of the curable composition to very minute portions in molding processing, the viscosity is more preferably 5000 mPa·s or lower. For good levelling (surface smoothness) of the resulting film, the viscosity is still more preferably 2000 mPa·s or lower.

The curable composition of the present invention that is of a solvent-free type can be prepared by uniformly dissolving or dispersing the fluorine-containing polymer, the acid anhydride, and other necessary components in the epoxy compound. The fluorine-containing polymer, the acid anhydride, and other necessary components have only to be finally uniformly dissolved or dispersed in the epoxy compound, and the components may be mixed in any order.

The curable composition of the present invention may be in the form of dispersion in which the fluorine-containing polymer, the acid anhydride, and other necessary components are dispersed in the epoxy compound or may be in the form of solution in which the components are dissolved. In order to form a uniform film and to enable formation of a film at a relatively low temperature, the curable composition is preferably in the form of a uniform solution.

The application method may be any appropriate known method in accordance with the use of the composition. If the film thickness needs to be controlled, the application method may be roll coating, gravure coating, microgravure coating, flow coating, bar coating, spray coating, die coating, spin coating, or dip coating.

The curable composition of the present invention is easily cured under usual heat-curing conditions and thus is capable of providing a cured product having low vapor permeability, a high elastic modulus, a low linear expansion coefficient, and a low refractive index. As mentioned here, a cured product obtained by curing the curable composition of the present invention is also one aspect of the present invention.

The curable composition of the present invention may be cured (crosslinked) by any appropriate method in accordance with, for example, the components used. The curable composition is usually cured at a temperature from room temperature (e.g., 20° C.) to 200° C. for 1 minute to 24 hours. The curable composition may be cured at normal pressure, under pressure, or under reduced pressure, and in the air.

The curing method may be any method, and examples thereof include steam crosslinking, pressure molding, and usual methods in which the crosslinking reaction is initiated by heating.

The curable composition of the present invention may be used for formation of films. Still, the curable composition is particularly useful as a molding material for various molded articles. Examples of the molding method include extrusion molding, injection molding, compression molding, blow molding, transfer molding, stereolithography, nanoimprinting, and vacuum forming.

The photo-curable resin composition of the present invention is useful as an optical material for optical devices, such as a material for optical waveguides, and a sealant material required for processing of optical devices, as well as an optical material for display devices, such as an anti-reflection film. Further, the photo-curable resin composition can be used as a sealant material for electronic semiconductors, a water- and moisture-resistant adhesive, and an adhesive for optical members and elements.

A cured product obtained by curing the curable composition of the present invention is excellent in transparency, and thus is suitably used as an optical member. The cured product of the present invention preferably has a light transmittance of 80% or higher. The light transmittance is more preferably 85% or higher, still more preferably 90% or higher. The light transmittance of the cured product can be determined using a spectrophotometer (U-4100, Hitachi, Ltd.) at a wavelength of 550 nm. Since the cured product of the present invention not only is excellent in transparency but also, as mentioned above, exerts exceptional performance as a sealant, the cured product is particularly suitable as a sealant for optical elements.

The cured product obtained by curing the curable composition of the present invention is excellent in heat resistance, and thus is also suitable for the use as a sealant requiring heat resistance, such as a sealant for power devices.

EXAMPLES

The present invention will be described in detail below referring to, but not limited to, examples.

The measurement methods used herein are as follows.

(1) Fluorine Content

The fluorine content (mass %) was obtained by determining the fluoride ion concentration by a method with a fluoride ion selective electrode utilizing an oxygen flask combustion method.

(2) $^1$H-NMR Measurement $^1$H-NMR measurement condition: 400 MHz (tetramethylsilane=0 ppm)

(3) $^{19}$F-NMR Measurement $^{19}$F-NMR measurement condition: 376 MHz (trichlorofluoromethane=0 ppm)

(4) Molecular Weight and Molecular Weight Distribution

The weight average molecular weight (Mw) and the number average molecular weight (Mn) were calculated based on the data obtained by gel permeation chromatography (GPC) with polystyrene used as a standard sample and tetrahydrofuran (THF) flowed as a solvent at a rate of 1 ml/min.

(5) Glass Transition Temperature (Tg)

The sample was subjected to temperature increase (first run), temperature decrease, and temperature increase (second run) at a rate of 10° C./min within the temperature range of −50° C. to 200° C. using a differential scanning calorimeter (DSC). The middle point of the resulting endothermic curve in the second run was defined as the glass transition temperature Tg (° C.).

(6) Melting Point (Tm)

The sample was heated at a rate of 10° C./min using a differential scanning calorimeter (DSC). The temperature corresponding to the maximum point in the resulting heat-of-fusion curve was defined as the melting point Tm (° C.).

(7) IR Analysis

The IR analysis was performed using a Fourier transform infrared spectrophotometer at room temperature.

(8) Hydroxyl Value

The hydroxyl value was determined in conformity with JIS K0070-1992.

(9) Refractive Index ($n_D$)

The refractive index was determined at 25° C. using an Abbe refractometer with sodium D lines as a light source.

Table 4 shows the polymers used in the examples and the physical properties thereof. The composition (mole ratio) of the polymer was determined by fluorine elemental analysis. The alternation rate between the fluorine olefin and the vinyl ester was calculated by $^1$H-NMR. The weight average molecular weight and the molecular weight distribution (Mw/Mn) were determined by GPC. The glass transition temperature was determined using a DSC. The compositional ratio of the polymer B1 was determined also by $^{19}$F-NMR.

TABLE 4

| Polymer | Composition (mole ratio) | Alternation rate (%) | Weight average molecular weight | Mw/Mn | Tg (° C.) | Yield (%) |
|---|---|---|---|---|---|---|
| A1 | TFE/vinyl acetate | 57/43 | 9459 | 1.22 | 29 | 75.2 |
| A2 | TFE/vinyl acetate | 49/51 | 537,650 | 4.30 | 40 | 72.4 |
| A3 | TFE/vinyl acetate | 43/57 | 42,293 | 2.06 | 28 | 73.1 |
| B1 | TFE/HFP/vinyl stearate | 48/13/39 | 79,500 | 4.61 | 39 (Tm) | 98.0 |
| C1 | TFE/t-butyl vinyl ether | 48/52 | 19,028 | 1.39 | 32 | 62.5 |

The polymers used in the examples were hydrolyzed, and the hydroxyl values and the refractive indexes thereof were determined. Table 5 shows the results.

TABLE 5

| Polymer before hydrolysis | Time | Degree of saponification (%) | Polymer after hydrolysis | Hydroxyl value (mgKOH/g) | Refractive index |
|---|---|---|---|---|---|
| A3 | 30 min | 34 | A3-34 | 130 | 1.394 |
| A3 | 60 min | 45 | A3-45 | 177 | 1.397 |
| A3 | 120 min | 86 | A3-86 | 385 | 1.406 |
| A3 | 1 day | 96 | A3-96 | 445 | 1.408 |
| A1 | 1 day | 98 | A1-98 | 310 | 1.379 |
| B1 | 1 day | 97 | B1-97 | 248 | 1.371 |
| A2 | 1 day | 96 | A2-96 | 380 | 1.396 |
| C1 | 120 min | 95 | C1-95 | 375 | 1.398 |

(degree of deprotection)

The other polymers used in the examples are listed below.
(Polymer E1)
A fluoroallyl ether polymer (a) (PAEH-1) was obtained using a fluoroallyl ether represented by the following formula:

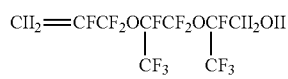

which is called perfluoro-(1,1,9,9-tetrahydro-2,5-bistrifluoromethyl-3,6-dioxanonenol).

This polymer was subjected to $^{19}$F-NMR analysis (measurement condition: 282 MHz (trichlorofluoromethane: 0 ppm)) and $^1$H-NMR analysis (measurement condition: 300 MHz (tetramethylsilane=0 ppm), and was analyzed by IR analysis (Fourier transform infrared spectrophotometer 1760X, Perkin Elmer Japan Co., Ltd., at room temperature). Thereby, the polymer was found to be a fluorine-containing polymer consisting only of the structural unit of the above fluoroallyl ether and having a hydroxy group at an end of a side chain. The number average molecular weight and the weight average molecular weight each measured by GPC analysis with THF used as a solvent were 9000 and 22000, respectively. The other physical properties were as follows:

Tg=31° C.; fluorine content (mass %)=60; hydroxyl value (mgKOH/g)=137; and refractive index=1.351.

This polymer was referred to as E1.

(Hydroxy- and Fluorine-Containing Polymer D1)
A hydroxy- and fluorine-containing polymer D1 having the following composition was produced. The hydroxy- and fluorine-containing polymer D1 had a weight average molecular weight of 50000, a hydroxyl value of 66 mgKOH/g, and a refractive index of 1.420.

TABLE 6

| | Composition (mol %) | | | |
|---|---|---|---|---|
| Polymer | TFE | VeoVa-9 | HBVE | UDA |
| D1 | 57.4 | 30.4 | 11.7 | 0.5 |

VeoVa-9 (trade name, Momentive Speciality Chemicals Inc., Tg of homopolymer: 70° C.)
HBVE (4-hydroxybutyl vinyl ether)
UDA (undecylenic acid)

(Polymer F1)
A copolymer F1 having a 1,3-dioxole ring unit content of 51 mol % and a tetrafluoroethylene unit content of 49 mol % was produced. The refractive index was 1.324 and the hydroxyl value was substantially 0 mgKOH/g.

(Polymer E2)
A polymer E2 (m:n=50:50) having the following structure was produced. The polymer E2 was identified by $^{19}$F-NMR.

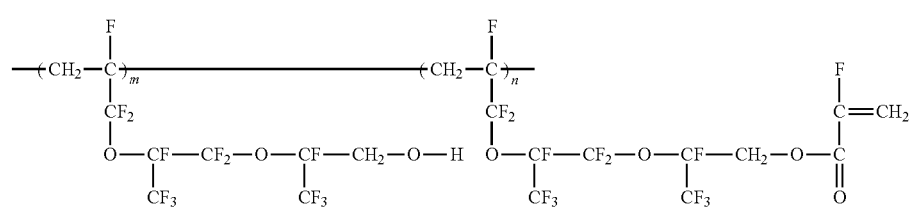

The fluorine-containing polymer E2 had a refractive index of 1.370 and a hydroxyl value of 63 mgKOH/g.

Example 1 (Solubility in Group α Compound)

The polymers A1-98 and B1-97 were each added to the epoxy compound shown in Table 7 such that the proportion of the polymer was 10 mass %.

The appearance of the polymer was visually observed, and the solubility was evaluated by the following criteria. Table 7 shows the results.

Good: uniformly dissolved
Acceptable: partially not dissolved
Poor: not dissolved Examples 2 to 6 (Solubility in Group α Compound)

The solubility test was performed in the same manner as in Example 1 except that the fluorine-containing polymer A3-34, A3-45, A3-86, A3-96, or E1 was used. Table 7 shows the results.

Comparative Example 1 (Solubility in Group α Compound)

The solubility test was performed in the same manner as in Example 1 except that the fluorine-containing polymer F1 was used. Table 7 shows the results.

Comparative Example 2 (Solubility in Group α Compound)

The solubility test was performed in the same manner as in Example 1 except that the fluorine-containing polymer D1 was used. Table 7 shows the results.

TABLE 7

| Group | Epoxy compound Formula | Example 1 A1-98 | Example 2 A3-34 | Example 3 A3-45 | Example 4 A3-86 | Example 5 A3-96 | Example 6 E1 | Comparative Example 1 F1 | Comparative Example 2 D1 |
|---|---|---|---|---|---|---|---|---|---|
| α | $H_2C\text{—}CH\text{—}CH_2\text{—}O\text{—}(CH_2\text{—}CH_2\text{—}O)_2\text{—}CH_2\text{—}CH\text{—}CH_2$ (epoxy ends) | Good | Good | Good | Good | Good | Good | Poor | Good |
| α | $H_2C\text{—}CH\text{—}CH_2\text{—}O\text{—}(CH_2\text{—}CH_2\text{—}O)_3\text{—}CH_2\text{—}CH\text{—}CH_2$ (epoxy ends) | Good | Good | Good | Good | Good | Good | Poor | Good |
| α | $H_2C\text{—}CH\text{—}CH_2\text{—}O\text{—}CH_2\text{—}CH(CH_3)\text{—}O\text{—}CH_2\text{—}CH\text{—}CH_2$ (epoxy ends) | Good | Good | Good | Good | Good | Good | Poor | Good |
| α | $H_2C\text{—}CH\text{—}CH_2\text{—}O\text{—}(CH_2\text{—}CH(CH_3)\text{—}O)_3\text{—}CH_2\text{—}CH\text{—}CH_2$ (epoxy ends) | Good | Good | Good | Good | Good | Good | Poor | Good |
| α | $H_2C\text{—}CH\text{—}CH_2\text{—}O\text{—}(CH_2)_6\text{—}O\text{—}CH_2\text{—}CH\text{—}CH_2$ (epoxy ends) | Good | Good | Good | Good | Good | Good | Poor | Good |
| α | $H_2C\text{—}CH\text{—}CH_2\text{—}O\text{—}CH_2\text{—}C(CH_3)_2\text{—}CH_2\text{—}O\text{—}CH_2\text{—}CH\text{—}CH_2$ (epoxy ends) | Good | Good | Good | Good | Good | Good | Poor | Good |
| α | bis(3,4-epoxycyclohexylmethyl) structure with —CH₂—O—C(=O)— linkage | Good | Good | Good | Good | Good | Good | Poor | Acceptable |

Example 7 (Solubility in Group β Compound)

The fluorine-containing polymer A1-98 was added to the epoxy compounds shown in Table 8 such that the proportion of the polymer was 10 mass %, and the components were stir-mixed at 45° C. for 24 hours using a table-top mill. The appearance of the polymer was visually observed, and the solubility was evaluated by the same criteria as in Example 1. Table 8 shows the results.

Example 8 (Solubility in Group β Compound)

The solubility test was performed in the same manner as in Example 7 except that the fluorine-containing polymer E1 was used. Table 8 shows the results.

TABLE 8

| Epoxy compound | | Example 7 | Example 8 |
|---|---|---|---|
| Group | Formula | A1-98 | E1 |
| β | 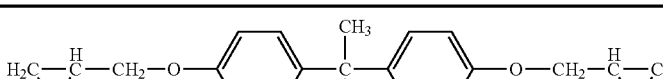 | Acceptable | Acceptable |
| β |  | Acceptable | Acceptable |
| β | 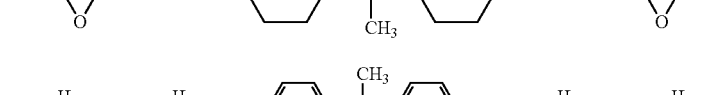 | Acceptable | Acceptable |

Examples 9, 10, and 11 (Dissolved in Group α Compound, and Uniformly Mixed with Group β Compound)

Epoxy compounds belonging to the group β shown in Table 9 were each added to one of the uniform compositions obtained in Example 1, 4, and 6 such that the proportion of the polymer was 10 mass %, and the components were stir-mixed at 45° C. for 24 hours using a table-top mill. The appearance of the polymer was visually observed, and the solubility was evaluated by the same criteria as in Example 1. Table 9 shows the results.

TABLE 9

| | Fluorine-containing polymer | Group α epoxy compound | Group β epoxy compound | Solubility |
|---|---|---|---|---|
| Example 9 | A1-98 | 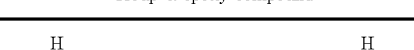 | 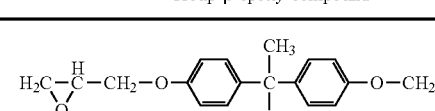 | Good |
| Example 10 | A3-86 |  |  | Good |
| Example 11 | E1 |  | 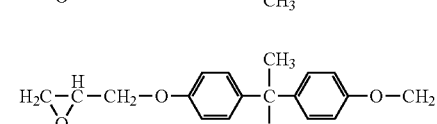 | Good |

Example 12 (Examples 12-1 to 12-12)

Curable compositions were produced in accordance with the compositions shown in Table 10. The steps of producing each composition were (1) uniformly dissolving the fluorine-containing polymer in the group α epoxy compound; (2) optionally adding the group β epoxy compound to the uniform solution obtained in the step (1); and (3) dissolving a curing catalyst in an acid anhydride, and then uniformly mixing this solution with the solution obtained in the step (1) or (2). In the step (3), the components were mixed. The acid anhydride was HN-5500 (Hitachi Chemical Co., Ltd.). The epoxy curing catalyst was U-CAT 18X (specialty tertiary amine catalyst), U-CAT 5003 (quaternary phosphonium salt catalyst), or U-CAT SA-102 (DBU/octanoic acid salt catalyst), each available from San-Apro Ltd.

If no acid anhydride was used, the steps were (1) uniformly dissolving the fluorine-containing polymer in the group α epoxy compound; (2) optionally adding the group β epoxy compound to the uniform solution obtained in the step (1); and (3) uniformly mixing the curing catalyst with the solution obtained in the step (1) or (2). In the step (3), the components were mixed using a degassing and stirring device in the same manner as in the case of using an acid anhydride.

The curing conditions in the case of U-CAT 5003 or U-CAT 18X were heating at 90° C. for 2 hours and then heating at 130° C. for 3 hours. The curing conditions in the case of U-CAT SA-102 were heating at 100° C. for 2 hours and then heating at 130° C. for 6 hours.

The curability was evaluated by the following criteria.
Good: uniformly cured
Acceptable: not uniformly cured
Poor: not cured
The appearance was visually observed.
Table 10 shows the results.

TABLE 10

| | Example 12-1 | Example 12-2 | Example 12-3 | Example 12-4 | Example 12-5 | Example 12-6 | Example 12-7 | Example 12-8 | Example 12-9 | Example 12-10 | Example 12-11 | Example 12-12 |
|---|---|---|---|---|---|---|---|---|---|---|---|---|
| Fluorine-containing polymer A1-98 | 0.100 | 0.100 | 0.100 | 0.100 | 0.100 | 0.100 | 0.100 | 0.200 | 0.188 | 0.219 | 0.200 | 0.200 |
| Group α: $H_2C\underset{O}{\overset{H}{-}}C-CH_2-O-CH_2-CH(CH_3)-O-CH_2-\underset{O}{\overset{H}{C}}-CH_2$ | — | 0.400 | 0.400 | — | 0.200 | — | — | — | — | — | — | — |
| Group α: $H_2C\underset{O}{\overset{H}{-}}C-CH_2-O-(CH_2)_6-O-CH_2-\underset{O}{\overset{H}{C}}-CH_2$ | — | — | — | 0.400 | — | — | — | — | — | — | — | — |
| Group α: $C(CH_3)_2[CH_2-O-CH_2-\underset{O}{\overset{H}{C}}-CH_2]_2$ (trimethylolpropane-type triglycidyl ether) | 0.400 | — | — | — | 0.200 | 0.400 | 0.400 | 0.300 | 0.250 | — | — | 0.300 |
| Group α: 3,4-epoxycyclohexylmethyl 3,4-epoxycyclohexanecarboxylate | — | — | — | — | — | — | — | — | — | 0.250 | 0.300 | — |
| Group β: bisphenol A diglycidyl ether | — | — | — | — | — | 0.400 | 0.800 | — | — | — | — | — |

TABLE 10-continued

|  |  | Example 12-1 | Example 12-2 | Example 12-3 | Example 12-4 | Example 12-5 | Example 12-6 | Example 12-7 | Example 12-8 | Example 12-9 | Example 12-10 | Example 12-11 | Example 12-12 |
|---|---|---|---|---|---|---|---|---|---|---|---|---|---|
| Acid anhydride | 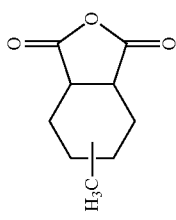 | 0.180 | 0.225 | 0.201 | 0.168 | 0.175 | 0.605 | 1.030 | 0.023 | — | — | 0.023 | 0.023 |
| Catalyst | U-CAT 18X | 0.0102 | 0.0109 | 0.0100 | 0.0101 | 0.0103 | 0.0226 | 0.0350 | 0.0078 | 0.0066 | 0.0070 | — | — |
|  | U-CAT 5003 | — | — | — | — | — | — | — | — | — | — | 0.0157 | — |
|  | U-CAT SA-102 | — | — | — | — | — | — | — | — | — | — | — | 0.0157 |
| Curability |  | Good | Good | Good | Good | Good | Good | Good | Good | Good | Good | Good | Good |
| Appearance |  | Transparent yellow | Transparent brown | Transparent yellow | Transparent yellow | Transparent yellow | Transparent yellow | Transparent yellow | Transparent yellow | Transparent yellow | Transparent brown | Colorless transparent | Colorless transparent |

* The unit for the compositions in the table is part(s) by mass.

Example 13 (Examples 13-1 to 13-2)

Curable compositions were produced in accordance with the compositions shown in Table 11. The production steps were the same as in Example 12.

The curable composition produced was sandwiched between two glass plates subjected to releasing treatment with Optool DSX (Daikin Industries, Ltd.) with 100-μm spacers disposed in between. The workpiece was heated at 100° C. for 2 hours, and then cured by heating at 130° C. for 6 hours. The physical properties of the resulting cured product were determined by the following methods. The refractive index was determined by the aforementioned method. Table 11 shows the results.

(Elastic Modulus and Glass Transition Temperature (Tg))

The parameters were determined using a dynamic viscoelasticity analyzer at a measurement temperature from 25° C. to 200° C.

Tg was the temperature corresponding to tan δ peak, and the elastic modulus was a value at 30° C.

(Water Vapor Transmission Rate)

The water vapor transmission rate at 40° C. and 90% RH was determined by the dish method in conformity with JIS Z0208.

(Dielectric Loss Tangent and Dielectric Constant)

Aluminum was vapor-deposited in vacuo on both surfaces of the film (cured product) produced. The resulting article was used as a measurement sample. The capacitance and the dielectric loss tangent of this sample was determined using an LCR meter at 30° C. and a frequency of 1 kHz. The dielectric constant was calculated from the film thickness and the capacitance.

(Linear Expansion Coefficient)

The elongation of the film was determined using a thermomechanical analyzer (TMA, tension mode) at a temperature within the range of 25° C. to 150° C., a temperature-increasing rate of 2° C./min, and a chuck-to-chuck distance of 10 mm. Based on the measured results, the average linear thermal expansion coefficient was calculated by the following formula:

$$\text{Average linear thermal expansion coefficient} = (1/L(30))\{(L(50)-L(30))/(50-30)\}$$

wherein $L(30)$ is the sample length at 30° C. and $L(50)$ is the sample length at 50° C.

Comparative Example 3

A curable composition was produced in accordance with the composition shown in Table 11, and the physical properties were determined in accordance with Example 13. Table 11 shows the results.

TABLE 11

| | | Example 13-1 | Example 13-2 | Comparative Example 3 |
|---|---|---|---|---|
| Fluorine-containing polymer | A1-98 | 0.188 | 0.188 | 0 |
| Group α | 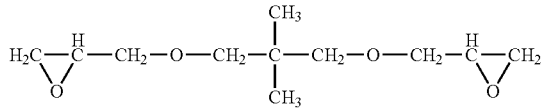 | 0.375 | 0.375 | 0.375 |
| Group β | 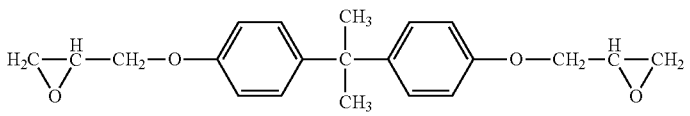 | 0.375 | 0.375 | 0.375 |
| Acid anhydride | 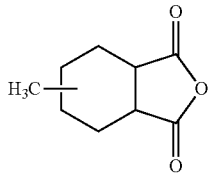 | 0.651 | 0.820 | 0.351 |
| Curing catalyst | U-CAT SA-102 | 0.015 | 0.015 | 0.015 |
| Results | Elastic modulus (GPa) | 2.5 | 2.3 | 2.9 |
| | Tg (° C.) | 95 | 101 | 103 |
| | Water vapor transmission rate (g/m² · 24 h) | 9.6 | 8.9 | 11.8 |
| | Dielectric constant (1 kHz) | 3.80 | 3.67 | 3.73 |
| | Dielectric loss tangent (1 kHz) | 0.46% | 0.68% | 0.57% |
| | Linear expansion coefficient (ppm) | 65 | 35 | 91 |
| | Refractive index | 1.55 or lower | 1.55 or lower | Higher than 1.55 |

\* The unit for the compositions in the table is part(s) by mass.

Example 14 (Examples 14-1 to 14-6)

Curable compositions were produced in accordance with the compositions shown in Table 12. The steps of producing each composition were (1) uniformly dissolving the fluorine-containing polymer in the group α epoxy compound;

and (2) dissolving a curing catalyst in an acid anhydride to provide a solution, and then uniformly mixing this solution with the solution obtained in the step (1).

The components were mixed in the step (2) using a degassing and stirring device.

The uniformity of the composition at the step (1) was evaluated by the following criteria.

Good: transparent and uniform
Acceptable: not uniform
Poor: not dissolved

Table 12 shows the results.

The acid anhydride was HN-5500 (Hitachi Chemical Co., Ltd.).

The epoxy curing catalyst was U-CAT 18X (specialty tertiary amine catalyst) or U-CAT SA-102 (DBU/octanoic acid salt catalyst) each available from San-Apro Ltd.

The curing conditions in the case of U-CAT 18X were heating at 90° C. for 2 hours and then heating at 130° C. for 3 hours. The curing conditions in the case of U-CAT SA-102 were heating at 100° C. for 2 hours and then heating at 130° C. for 6 hours.

The curability was evaluated by the following criteria.
Good: uniformly cured
Acceptable: not uniformly cured
Poor: not cured The appearance was visually evaluated.

The refractive index of the cured product was determined by the aforementioned method.

Table 12 shows the results.

Example 15 (Mixing and Film Formation Using Solution)

An epoxy compound that is in a solid state at room temperature and belongs to the group α, called a 1,2-epoxy-4-(2-oxiranyl)cyclohexane adduct of 2,2-bis(hydroxymethyl)-1-butanol (hereinafter, also referred to as an epoxy compound A), was dissolved in butyl acetate such that the concentration of the adduct was 10 mass %. Further, the fluorine-containing polymer E1 was dissolved in butyl acetate such that the concentration of the polymer was 10 mass %. The solutions were mixed in a ratio (mass ratio) shown in Table 13, and the solution mixture was cast into a film at room temperature. The appearance of the film was evaluated by the following criteria. Table 13 shows the results.

Good: uniformly transparent
Acceptable: partially cloudy
Poor: entirely cloudy

Example 16 (Mixing and Film Formation Using Solution)

Casting film formation was performed in the same manner as in Example 15 except that the fluorine-containing polymer E1 was replaced by A1-98. Table 13 shows the results.

TABLE 12

| | | Example 14-1 | Example 14-2 | Example 14-3 | Example 14-4 | Example 14-5 | Example 14-6 |
|---|---|---|---|---|---|---|---|
| Fluorine-containing polymer | E1 | 0.292 | 0.330 | 0.339 | — | — | — |
| | A1-98 | — | — | — | 0.301 | 0.282 | 0.291 |
| Group α | $H_2C{-}\overset{H}{\underset{\diagdown O \diagup}{C}}{-}CH_2{-}O{-}(CH_2)_6{-}O{-}CH_2{-}\overset{H}{\underset{\diagdown O \diagup}{C}}{-}CH_2$ | 0.707 | — | — | 0.738 | — | — |
| | $H_2C{-}\overset{H}{\underset{\diagdown O \diagup}{C}}{-}CH_2{-}O{-}CH_2{-}\underset{CH_3}{\overset{CH_3}{C}}{-}CH_2{-}O{-}CH_2{-}\overset{H}{\underset{\diagdown O \diagup}{C}}{-}CH_2$ | — | 0.722 | — | — | 0.728 | — |
| | $H_2C{-}\overset{H}{\underset{\diagdown O \diagup}{C}}{-}CH_2{-}O{-}(CH_2{-}CH_2{-}O)_3{-}CH_2{-}\overset{H}{\underset{\diagdown O \diagup}{C}}{-}CH_2$ | — | — | 0.717 | — | — | 0.715 |
| Acid anhydride | (methylhexahydrophthalic anhydride) | 0.933 | 0.992 | 0.541 | 0.921 | 0.983 | 0.598 |
| Catalyst | U-CAT 18X | 0.049 | 0.042 | 0.021 | — | — | — |
| | U-CAT SA-102 | — | — | — | 0.039 | 0.041 | 0.038 |
| Results | Uniformity | Good | Good | Good | Good | Good | Good |
| | Curability | Good | Good | Good | Good | Good | Good |
| | Appearance | Colorless transparent | Colorless transparent | Colorless transparent | Colorless transparent | Colorless transparent | Colorless transparent |
| | Refractive index | 1.46 | 1.47 | 1.49 | 1.49 | 1.49 | 1.51 |

* The unit for the compositions in the table is part(s) by mass.

Comparative Example 4 (Mixing and Film Formation Using Solution)

Casting film formation was performed in the same manner as in Example 15 except that the fluorine-containing polymer E1 was replaced by D1. Table 13 shows the results.

Comparative Example 5 (Mixing and Film Formation Using Solution)

Casting film formation was performed in the same manner as in Example 15 except that the fluorine-containing polymer E1 was replaced by E2. Table 13 shows the results.

TABLE 13

|  | Example 15 | Example 16 | Comparative Example 4 | Comparative Example 5 |
|---|---|---|---|---|
|  | Fluorine-containing polymer | | | |
| Epoxy compound A:Fluorine-containing polymer | E1 | A1-98 | D1 | E2 |
| 75:25 | Good | Good | Poor | Poor |
| 50:50 | Good | Good | Poor | Poor |
| 25:75 | Good | Good | Poor | Poor |

Example 17

An epoxy curing catalyst, called San-Aid SI-60L, in an amount of 0.5 mass % based on the solids content was added to the solution (epoxy compound A:fluorine-containing polymer=50:50) obtained in Example 15. The mixture was cast at room temperature and cured at 90° C. for 2 hours and at 130° C. for 3 hours. Thereby, a film was obtained. The resulting film had a total light transmittance of 91% and a haze of 6.8.

The film was immersed in an acrylonitrile solution at room temperature, and the change in weight after 24 hours was determined; the degree of swelling was 3.2%.

The total light transmittance and the haze were determined using a haze meter in conformity with ASTM D1003.

Example 18

An epoxy curing catalyst, called San-Aid SI-60L, in an amount of 0.5 mass % based on the solids content was added to the solution obtained in Example 16. The mixture was cast at room temperature and cured at 90° C. for 2 hours and at 130° C. for 3 hours. Thereby, a film was obtained.

The film was immersed in an acrylonitrile solution at room temperature, and the change in weight after 24 hours was determined; the degree of swelling was about 4%.

Comparative Example 6

An epoxy curing catalyst, called San-Aid SI-60L, in an amount of 0.5 mass % based on the solids content was added to the solution obtained in Example 15.

The mixture was cast at room temperature and immersed in an acrylonitrile solution. Then, the cast product was dissolved.

The invention claimed is:

1. A curable composition comprising
a fluorine-containing polymer having a hydroxyl value of 310 mgKOH/g or higher and a refractive index of 1.42 or lower, and
an epoxy compound,
wherein the fluorine-containing polymer includes a fluoroolefin unit and a vinyl alcohol unit wherein the vinyl alcohol unit has the formula $-CH_2-CH(OH)-$.

2. The curable composition according to claim 1, further comprising an acid anhydride.

3. The curable composition according to claim 1,
wherein the fluorine-containing polymer has a fluoroolefin unit content of 30 mol% or more.

4. A curable composition comprising
a fluorine-containing polymer having a hydroxyl value of 310 mgKOH/g or higher and a refractive index of 1.42 or lower, and
an epoxy compound,
wherein the fluorine-containing polymer includes a unit based on a monomer represented by the following formula (1):

$$CH_2=CX^1-CX^2X^3-(O)_x-R^1-OH \quad (1)$$

wherein $X^1$, $X^2$, and $X^3$ are F; $R^1$ is a divalent organic group which may optionally have an ether bond; and x is 0 or 1,
wherein $R^1$ is $-CF(CF_3)-(CF_2-O-CF(CF_3))_n-CH_2-$ (where n is an integer of 0 to 10).

5. The curable composition according to claim 1, further comprising a curing accelerator.

6. The curable composition according to claim 1,
wherein the epoxy compound is in a liquid state at 25° C., and has a ratio of a dispersion component, a polarity component, and a hydrogen bonding component of a solubility parameter within a range defined by the point A (86, 7, 7), the point B (70, 25, 5), the point C (50, 25, 25), the point D (50, 5, 45), and the point E (82, 5, 13) illustrated in FIG. 1.

7. The curable composition according to claim 1,
wherein the epoxy compound is at least one compound selected from the group consisting of the following compounds:

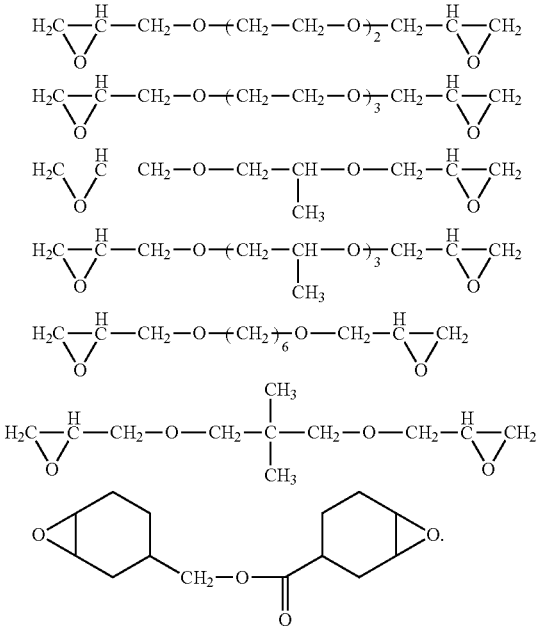

8. The curable composition according to claim 1, which is free from an organic solvent that has no radical reactive group.

* * * * *